US011161038B2

(12) United States Patent
Penello et al.

(10) Patent No.: US 11,161,038 B2
(45) Date of Patent: Nov. 2, 2021

(54) SYSTEMS AND DEVICES FOR CONTROLLING NETWORK APPLICATIONS

(71) Applicant: Amazon Technologies, Inc., Seattle, WA (US)

(72) Inventors: Albert John Penello, Woodinville, WA (US); Omar Sze Leung, Palo Alto, CA (US); Ravi Ichapurapu, Morgan Hill, CA (US); Sameet Ramakrishnan, Saratoga, CA (US); Marc Randall Whitten, Bellevue, WA (US); Evan Fletcher Dougal, Mountain View, CA (US); Michael Risley, San Francisco, CA (US); Brian Fisher, Lake Forest, CA (US); Doyle Albert Martin, Rancho Santa Margarita, CA (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 16/202,959

(22) Filed: Nov. 28, 2018

(65) Prior Publication Data

US 2020/0038749 A1 Feb. 6, 2020

Related U.S. Application Data

(60) Provisional application No. 62/715,146, filed on Aug. 6, 2018.

(51) Int. Cl.
*A63F 13/355* (2014.01)
*A63F 13/335* (2014.01)
(Continued)

(52) U.S. Cl.
CPC .......... *A63F 13/335* (2014.09); *A63F 13/358* (2014.09); *A63F 13/42* (2014.09);
(Continued)

(58) Field of Classification Search
CPC ...... A63F 13/35; A63F 13/355; A63F 13/358; A63F 2300/204; A63F 2300/207;
(Continued)

(56) References Cited

U.S. PATENT DOCUMENTS

| 5,557,724 | A  | * | 9/1996 | Sampat | .................. H04L 65/604 725/43 |
| 6,279,029 | B1 | * | 8/2001 | Sampat | ............... H04L 12/1859 709/203 |

(Continued)

OTHER PUBLICATIONS

PCT Search Report and Written Opinion dated Nov. 15, 2019, for PCT Application No. PCT/US2019/044128, 12 pages.

(Continued)

*Primary Examiner* — Steven J Hylinski
(74) *Attorney, Agent, or Firm* — Lee & Hayes, P.C.

(57) ABSTRACT

This disclosure describes, in part, techniques for controlling network applications. For instance, a remote system may send, over a network, data representing a state of an application to a display device, such as a television. The remote system may then receive, over the network, input data from a control device. The input data may represent one or more inputs received by the control device. Using the input data, the remote system may update the state of the application. The remote system may then send, to the display device, data representing the updated state of the application. In some instances, the remote system may further send, to the control device, audio data representing sound corresponding to the updated state of the application. The control device may synchronize outputting of the sound with the displaying the updated state of the application by the display device.

20 Claims, 11 Drawing Sheets

(51) Int. Cl.
*A63F 13/45* (2014.01)
*A63F 13/44* (2014.01)
*A63F 13/358* (2014.01)
*A63F 13/42* (2014.01)

(52) U.S. Cl.
CPC .............. *A63F 13/44* (2014.09); *A63F 13/45* (2014.09); *A63F 2300/403* (2013.01)

(58) Field of Classification Search
CPC .......... A63F 2300/407; A63F 2300/534; A63F 2300/6063; G06F 3/162; G06F 3/165; H04L 67/1097
See application file for complete search history.

(56) References Cited

U.S. PATENT DOCUMENTS

| | | | | |
|---|---|---|---|---|
| 7,546,384 | B1* | 6/2009 | Chatt | H04L 67/06 709/248 |
| 8,363,161 | B2* | 1/2013 | Pearlstein | H04N 21/4341 348/515 |
| 8,478,822 | B2* | 7/2013 | Lee | G06F 15/16 709/205 |
| 8,505,054 | B1* | 8/2013 | Kirley | H04N 21/4307 725/74 |
| 8,799,495 | B2* | 8/2014 | Wohlert | H04L 65/80 709/231 |
| 10,469,886 | B2* | 11/2019 | Capobianco | H04N 21/4302 |
| 10,630,773 | B2* | 4/2020 | Holmes | A63F 13/23 |
| 2006/0156375 | A1* | 7/2006 | Konetski | H04N 21/6543 725/135 |
| 2008/0137690 | A1* | 6/2008 | Krantz | H04L 65/604 370/503 |
| 2010/0317443 | A1* | 12/2010 | Cook | A63F 13/12 463/42 |
| 2011/0300946 | A1* | 12/2011 | Stafford | H04W 4/023 463/42 |
| 2014/0128159 | A1* | 5/2014 | Knutsson | A63F 13/63 463/31 |
| 2014/0221087 | A1* | 8/2014 | Huang | A63F 13/34 463/31 |
| 2015/0222730 | A1* | 8/2015 | Gower | H04L 65/607 709/203 |
| 2015/0281029 | A1 | 10/2015 | Callahan et al. | |
| 2015/0296247 | A1* | 10/2015 | Glasser | H04N 21/6587 725/74 |
| 2017/0072307 | A1* | 3/2017 | Perry | A63F 13/70 |
| 2017/0142201 | A1 | 5/2017 | Holmes | |
| 2017/0301140 | A1* | 10/2017 | Smith | G06T 19/006 |

OTHER PUBLICATIONS

Anonymous, "Presentation Timestamp", Wikipedia, the Free Encyclopedia, Aug. 23, 2010, Retrieved from the Internet: URL:https://en.wikipedia.org/w/index.php?title=Presentation_timestamp&oldid=380566916, retreived on May 31, 2016, 2 pages.

* cited by examiner

SYSTEMS AND DEVICES FOR CONTROLLING NETWORK APPLICATIONS

RELATED APPLICATIONS

This application claims priority to U.S. Provisional Patent Application No. 62/715,146, filed Aug. 6, 2018, titled "Game Controllers," the entire contents of which are incorporated herein by reference.

BACKGROUND

As gaming has become popular, companies have created electronic devices, such as video game consoles, that allow users to play various types of games. For example, a video game console, connected to a television, may cause the television to display content related to a state of a game. While the television is displaying the content, the video game console may receive inputs directly from a video game controller in possession of a user. The video game console may then process the inputs in order to update the state of the game. Based on the updates, the video game console may cause the television to display content related to the updated state of the game. If the user is playing a multiplayer online game, then the video game console may further send data representing the updates to a remote server.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
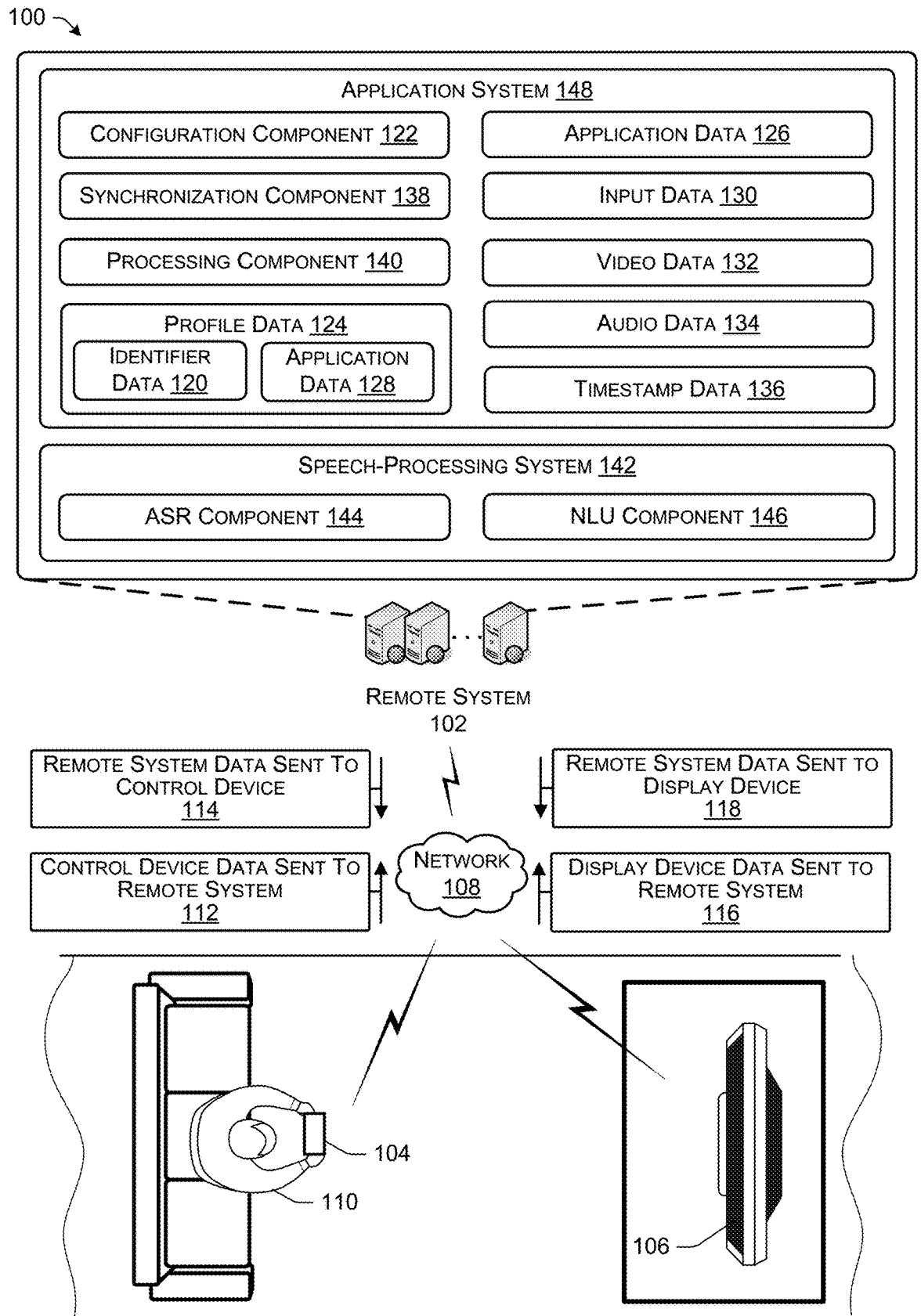
FIG. 1 illustrates a schematic diagram of an example system for controlling network applications.

This disclosure describes, in part, systems and techniques for controlling network applications. For instance, a user may control an application executing on a remote system using a control device that communicates with the remote system via a network connection. For instance, the control device may send data to the remote system, where the data represents at least inputs received by the control device. The remote system may then update a current state of the application using the data received from the control device. Additionally, the remote system may send, via the network connection, video data to a display device, where the video data represents the current state of the application. As such, and in some instances, an additional electronic device, such as a video game console, may not be required to execute the application and/or process the data from the control device. In such examples, this may remove the need of the additional electronic device.

For more detail, the user may initially configure the control device. The control device may include, but is not limited to, a video game controller, a keyboard, a mouse, a tablet, a mobile phone, a computer, a camera, a microphone, and/or any other type of device that is capable of receiving input from the user and/or capable to generating data. To configure the control device, the user may input configuration settings into the control device and/or another device. If the configuration settings are input into another device, the other device may then send data representing the configuration settings to the control device. The configuration settings may include, but are not limited to, an identifier associated with a network device (e.g., a service set identifier (SSID) associated with a router), password, and/or the like. The control device may then store data representing the configuration settings. Additionally, the control device may use the configuration settings to connect to the network in order to communicate with the remote system.

In some instances, the user may further configure the control device with the remote system. For instance, the remote system may receive, from the control device and/or another device, data representing an identifier of the control device. As described herein, an identifier of a device may include, but is not limited to, an Internet Protocol (IP) address, a media access control (MAC) address, a numerical identifier, an alphabetic identifier, a mixed numerical and alphabetic identifier, and/or any other type of identifier that may be used to identify the device. The remote system may then store the data representing the identifier of the control device in a user profile associated with the user. In some instances, if the remote system is not already storing the user profile, the remote system may initially generate the user profile before storing the data representing the identifier in the user profile.

In some instances, the user may further configure one or more display devices with the remote system. A display device may include, but is not limited to, a television, a projector, a monitor, a tablet, a mobile phone, a peripheral device that connects to another display device, and/or any other type of device that is capable to displaying content (e.g., image(s), videos, etc.) and/or capable of causing another device to display content. To configure a display device, the remote system may receive, from the display device and/or another device, data representing an identifier of the display device. The remote system may then store the data representing the identifier of the display device in the user profile.

In some instances, the remote system may further store data representing one or more applications that are accessible by the control device via the network. An application can include, but is not limited to, a gaming application, a word processing application, an educational application, a multimedia application (e.g., movie, music, etc.), and/or any other type of application that is capable of being accessed via the network. The remote system may associate one or more of the applications with the user profile. For instance, the remote system may receive data indicating that the user has acquired (e.g., purchased, leased, etc.) an application from the remote system. In some instances, the remote system may then store, in the user profile, data indicating that the user acquired by the application.

To access an application, the control device may connect to the network using the configuration settings. The control device may then send, to the remote system, data representing at least the identifier associated with the control device. The remote system may receive the data and determine, using the user profile, that the data is received from the control device. The remote system may further determine, using the user profile, that the control device is associated with at least the display device. In some instances, the remote system may then send, to the display device, data (e.g., video data, audio data, etc.) representing the one or more applications acquired by the user. In some instances, the remote system may send, to the display device, data (e.g., video data, audio data, etc.) representing one or more additional applications that are accessible for the user. In either example, the display device may receive the data and display content that identifies the one or more applications. For instance, the content may include a respective identifier (e.g., a name) of each of the one or more applications that are accessible to the user.

The remote system may then receive, from the control device, data (e.g., input data) representing a selection of an application. Based at least in part on the data, the remote system may begin executing data (e.g., computer code) representing the application. The remote system may then begin receiving data representing inputs received by the control device. In some instances, the remote system receives the data each time the control device receives an input. In some instances, the remote system receives the data at given time intervals (e.g., every millisecond, ten milliseconds, second, etc.). In either instance, the remote system uses the data to update the state of the application based on the input(s) being received by the control device. The remote system may then send data representing the states of the application to the display device.

For instance, the remote system may send, to the display device, data (e.g., video data, audio data, etc.) representing a first state of the application. For example, if the application includes a gaming application, the first state of the application may include an object (e.g., a character) located at a first position within a gaming environment (e.g., a forest). The display device may receive the data from the remote system. Using the data, the display device may display image(s) representing the first state of the application. For example, and again if the application includes the gaming application, the display device may display content representing the object located at the first position within the gaming environment. In some instances, the display device may further output sound represented by the audio data. The user may then use the control device to provide inputs to the application via the remote system.

For instance, the control device may receive an input, such as a selection of a button, joystick, key, touch-sensitive pad, sensor, and/or the like associated with the control device. The control device may then send, to the remote system, data representing the input. Using the data, the remote system may update the first state of the application to a second state of the application. For example, and again if the application includes the gaming application, the input may be associated with moving the object forward by a given amount within the gaming environment. As such, the remote system may update the first state of the of the application to the second state of the application by moving the object forward in the environment by the given amount. The remote system may then send, to the display device, data (e.g., video data, audio data, etc.) representing the second state of the application. The display device may display image(s) representing the second state of the game. For example, the display device may display content representing the object located at the second position within the gaming environment. Additionally, in some instances, the display device may further output sound represented by the audio data. The remote system may then continue to perform similar processes to update the state of the application on the display device as the remote system continues to receive data from the control device.

In some instances, the remote system may further send data (e.g., video data, audio data, etc.) to the control device, where the data is associated with the state of the application being displayed by the display device. For example, the remote system may send, to the control device, audio data that represents sound corresponding to a current state of the application being displayed by the display device. The control device may receive the audio data from the remote system and, in response, output the sound. In some instances, when sending audio data to the control device, the remote system, the control device, and/or another device may synchronize the output of the audio data with the current state of the application.

For a first example, the remote system may generate first timestamp data representing a first timestamp associated with the data being sent to the display device and/or second timestamp data representing a second timestamp associated with the audio data being sent to the control device. The remote system may then send the first timestamp data to the display device and the second timestamp data to the control device. In some instances, the remote system sends the first timestamp data as part of a first data packet to the display device, where the first data packet further includes the video data. In other instances, the remote system sends the first timestamp data to the display device separately from the video data. Additionally, in some instances, the remote system sends the second timestamp data as part of a second data packet to the control device, where the second data packet further includes the audio data. In other instances, the remote system sends the second timestamp data to the control device separately from the audio data.

The second timestamp data may be used by the control device to synchronize the output of the audio data with the displaying of the current state of the application by the display device. For instance, the first timestamp data may include a first instruction to display the current state of the application at a first time and the second timestamp data may include a second instruction to output the sound at a second time, where the first time is similar to (e.g., the same as, with a threshold period of time to, etc.) the second time. As such, the control device may store the audio data and/or the second timestamp data in a buffer. The control device may then determine when a current time includes the second time represented by the second timestamp data. When the current time includes the second time, the control device may output the sound represented by the audio data.

For a second example, the remote system may send the audio data, the video data, the first timestamp data, and the second timestamp data to a separate electronic device, such as a dongle. The electronic device may then use the first timestamp data and the second timestamp data to determine when to respectively send the video data to the display device and send the audio data to the control device. For instance, at the first time, the electronic device may send the video data to the display device. Based at least in part on receiving the video data, the display device may display the current state of the application. Additionally, at the second time, the electronic device may send the audio data to the control device. Based at least in part on receiving the audio data, the control device may output the sound.

In some instances, the remote system may receive, from the control device, audio data representing user speech from the user. The remote system may then process the audio data and perform one or more functions based on the processing. For a first example, if the user speech corresponds to an action to be performed by the application, the remote system may update the state of the application based on the user speech. For instance, if the user speech includes one or more words such as "move an object forward", then the remote system may update the state of the application by moving the object forward within a gaming environment. For a second example, if the user speech corresponds to a request to message a contact of the user, then the remote system may send a message the contact. For instance, if the application includes a gaming application, the message may include a request to join a multiplayer game with the user.

For a third example, if the user speech corresponds to a request to select an application, then the remote system may select the application and/or begin sending data representing the application to the display device. For instance, if the user speech includes one or more words such as "play the first gaming application", then the remote system may select the first gaming application and/or begin sending data representing the first gaming application to the display device. While these are just a couple of examples of using user speech to perform one or more functions, in other examples, the remote system may perform additional functions based on audio data received from the control device.

In some instances, such as when the application includes a gaming application, the remote system may perform similar processes and/or techniques as a video game console, a computing device, a tablet, and/or other electronic device to process the inputs received by the control device. However, unlike a traditional video game console, computing device, table, and/or other electronic device that is executing a gaming application, the remote system may be remote from the control device and/or the display device. For instance, the control device and/or the display device may be located in a user's environment, such as the user's home, apartment, office, and/or the like. The remote system may be remote from the user's environment and communicate with each of the control device and the display device via the network.

In the above examples, the remote system may be located remotely from the control device and the display device. For example, the control device and the display device may be located in an environment, such as a user's home, apartment, business, and/or the like. The remote system may then be located remotely from the environment, such as a cloud-based system. In other instances, the remote system may be located in the same environment as the control device and/or the display device. For instance, the remote system may include a device that is located within the environment.

In some instances, by having the control device communicate directly with the remote system, the processes and techniques described herein can reduce latency when using applications. For example, and for online gaming, instead of using a video game console to process the inputs from the control device and then send, to the remote system, data representing updates to the game, the control device sends the input data directly to the remote system (i.e., does not need to send the input data to a video game console), where the remote system then processes the inputs This can reduce the latency that is caused by the input data being initially sent to the video game console and/or the latency that is caused by the video game console processing the input data.

FIG. 1 is a schematic diagram of an example system 100 for controlling network applications. The system 100 may include, for example, a remote system 102, a control device 104, and a display device 106. In the example of FIG. 1, the control device 104 may communicate with the remote system 102 over a network 108, such as by using a first communication channel. For instance, the control device 104 may send data to the remote system 102 (which is represented by 112) and the remote system 102 may send data to the control device 104 (which is represented by 114). Additionally, the display device 106 may communicate with the remote system 102 over the network 108, such as by using a second communication channel. For instance, the display device 106 may send data to the remote system 102 (which is represented by 116) and the remote system 102 may send data to the display device 106 (which is represented by 118). By sending and receiving data with the control device 104 and the display device 106, the remote system 102 allows the user 110 to control, via the remote system 102, the application being displayed by the display device 106 using the control device 104.

For instance, the user 110 may initially configure the control device 104. The control device 104 may include, but is not limited to, a video game controller, a keyboard, a mouse, a tablet, a mobile phone, a computer, a camera, a microphone, and/or any other type of device that is capable of receiving input from the user 110 and/or generating data. To configure the control device 104, the user 110 may input configuration settings into the control device 104 and/or another device. In the configuration settings are input into another device, the other device may then send data representing the configuration settings to the control device 104. The configuration settings may include, but are not limited to, an identifier associated with a network device (e.g., SSID associated with a router (not shown)), password, and/or the like. The control device 104 may then store data representing the configuration settings. Additionally, the control device 104 may use the configuration settings to connect to the network 108 in order to communicate with the remote system 102.

In some instances, the user 110 may further configure the control device 104 with the remote system 102. For instance, the remote system 102 may receive, from the control device 104 and/or another device, identifier data 120 representing an identifier of the control device 104. The identifier of the control device 104 may include, but is not limited to, an IP address, a MAC address, a numerical identifier, an alphabetic identifier, a mixed numerical and alphabetic identifier, and/or any other type of identifier that may be used to identify the control device 104. The configuration component 122 may then be configured to store the identifier data 120 representing the identifier of the control device 104 in association with a user profile, where the user profile is represented by user profile data 124.

In some instances, the user 110 may further configure one or more display devices with the remote system 102, such as the display device 106. The display device 106 may include, but is not limited to, a television, a projector, a monitor, a tablet, a mobile phone, a peripheral device that connects to another display device, and/or any other type of device that is capable of displaying content (e.g., image(s), videos, etc.) and/or capable of causing another device to display content. To configure the display device 106, the remote system 102 may receive, from the display device 106 and/or another device, identifier data 120 representing an identifier of the display device 106. The identifier of the display device 106 may include, but is not limited to, an IP address, a MAC address, a numerical identifier, an alphabetic identifier, a mixed numerical and alphabetic identifier, and/or any other type of identifier that may be used to identify the display device 106 The configuration component 122 may then be configured to store the identifier data 120 representing the identifier of the display device 106 in association with the user profile.

In some instances, the remote system 102 may further store application data 126 representing one or more applications that are accessible by the control device 104 via the network 108. An application can include, but is not limited to, a gaming application, a word processing application, an educational application, a multimedia application (e.g., movie, music, etc.), and/or any other type of application that is capable of being accessed via the network 108. In some instances, the remote system 102 may associate one or more of the applications with the user profile. For instance, the remote system 102 may receive data indicating that the user 110 has acquired (e.g., purchased, leased, etc.) an application from the remote system 102. In some instances, the remote system 102 may then store application data 128 indicating that the user 110 acquired by the application. The remote system 102 may then allow the user 110 to access the application using the control device 104.

To access an application, the control device 104 may connect to the network 108, such as by using the configuration settings. The control device 104 may then send, to the remote system 102, the identifier data 120 representing at least the identifier associated with the control device 104. The remote system 102 may receive the identifier data 120 and determine, using the user profile data 124 (e.g., the stored identifier data 120), that the identifier data 120 is received from the control device 104. For example, the remote system 102 may match the identifier represented by the identifier data 120 received from the control device 104 with the identifier represented by the stored identifier data 120. Based at least in part on the match, the remote system 102 may determine that the identifier data 120 was sent from the control device 104.

The remote system 102 may further determine, using the user profile data 124, that the control device 104 is associated with at least the display device 106. For example, and based at least in part on determining that the identifier data 120 was sent from the control device 104, the remote system 102 may analyze the user profile data 124 associated with the user 110. The remote system 102 may then determine that the user profile data 124 includes and/or is associated with the identifier data 120 representing the identifier of the display device 106. Based at least in part on the determination, the remote system 102 may determine that the control device 104 is associated with the display device 106.

In some instances, the remote system 102 may then send, to the display device 106, data (e.g., video data, audio data, etc.) representing one or more applications that are available to the user 110. In some instances, the one or more application may include one or more applications that have been acquired by the user 110 (e.g., the one or more applications represented by the application data 128). Additionally, or alternatively, In some instances, the one or more applications may include one or more applications that are free to users. In either example, the display device 106 may receive the data from the remote system 102. The display device 106 may then display image(s) that represent the one or more applications that are available to the user 110. For example, the image(s) may include one or more identifiers (e.g., one or more names) of the one or more applications that are available to the user 110.

The remote system 102 may then receive, from the control device 104, input data 130 representing input(s) received by the control device 104. The remote system 102 may analyze the input data 130 to identify an application that is selected by the user 110. For example, the input(s) may correspond to movement(s) of an object, such as a cursor, across the image(s) representing the one or more applications. The input(s) may further correspond to a selection of one of the applications (e.g., a selection of a control on the control device 104 when the object is located over the selected application). The remote system 102 may then determine, based at least in part on the selection, that the user 110 selected the application.

The remote system 102 may then send, to the display device 106, data representing a first state of the application. The data may include first video data 132 representing image(s) of the first state of the application, first audio data 134 representing sound corresponding to the first state of the application, and/or first timestamp data 136 representing a time for displaying the first state of the application and/or a time for outputting the sound. In some instances, the remote system 102 sends a first data packet that includes the first video data 132, the first audio data 134, and/or the first timestamp data 136. In other instances, the remote system 102 may separately send the first video data, the first audio data, and/or the first timestamp data 136 to the display device 106.

The display device 106 may receive the data (and/or the first data packet) from the remote system 102. Using the first video data 132, the display device 106 may display image(s) representing the first state of the application. For example, if the application includes a gaming application, the display device 106 may display content representing a first state of the game. In the example of FIG. 1, the first state of the game may include an object (e.g., a character) located at a first position in a gaming environment (e.g., a forest). In some instances, the display device 106 may further output the sound represented by the first audio data 134. In some instances, the display device 106 displays the image(s) and/or outputs the sound according to the time(s) represented by the first timestamp data 136.

For example, the display device 106 may determine when a current time includes the time represented by the first timestamp data 136 for displaying the first video data 132. Based at least in part on the determination, the display device 106 may begin displaying the image(s) representing the first state of the application. Additionally, the display device 106 may determine when a current time includes the time represented by the first timestamp data 136 for outputting the sound. Based at least in part on the determination, the display device 106 may begin outputting the sound represented by the first audio data 134.

In some instances, the remote system 102 may additionally send, to the control device 104, data representing the first state of the application. The data may include second audio data 134 representing sound corresponding to the first state of the application and/or second timestamp data 136 representing a time for outputting the sound. In some instances, the remote system 102 sends a second data packet that includes the second audio data 134 and/or the second timestamp data 136. In other instances, the remote system 102 may send the second audio data 134 separately form the second timestamp data 136. The control device 104 may then output the sound represented by the second audio data 134. In some instances, the control device 104 may output the sound according to the time represented by the second timestamp data 136. In some instances, first timestamp data 136 and/or the second timestamp data 136 synchronizes the outputting of the sound by the display device 106 with the displaying of the image(s) by the display device 106.

For instance, a synchronization component 138 may be configured to synchronize at least the displaying of the image(s) by the display device 106 with the outputting of the sound by the control device 104. To perform the synchronization, the synchronization component 138 may generate the first timestamp data 136 for displaying the image(s) and/or the second timestamp data 136 for outputting the sound. For instance, the first timestamp data 136 may represent an instruction to display the image(s) at a first time. Additionally, the second timestamp data 136 may represent an instruction to output the sound at a second time. In some instances, the first time may be similar to the second time. In some instances, the first time may be within a threshold period of time to the second time. The threshold period of time may include, but is not limited to, 1 millisecond, 10 milliseconds, 1 second, and/or the like.

The user 110 can then use the control device 104 to provide inputs to the application. For instance, the control device 104 may receive an input, such as a selection of a button, joystick, key, touch-sensitive pad, sensor, and/or the like associated with the control device 104. The control device 104 may then send, to the remote system 102, input data 130 representing the input. Using the input data 130, a processing component 140 may update the first state of the application to a second state of the application. For example, and using the example above where the application includes the gaming application, the input may be associated with moving the object forward by a given amount within the gaming environment. As such, the processing component 140 may analyze the input data 130 to determine that the input includes moving the object forward by the given amount. The processing component 140 may then update the first state of the of the application to the second state of the application by moving the object forward in the environment by the given amount.

The remote system 102 may then send data representing a second state of the application to the display device 106. The data may include third video data 132 representing image(s) of the second state of the application, third audio data 134 representing sound corresponding to the second state of the application, and/or third timestamp data 136 representing a time for displaying the second state of the application and/or a time for outputting the sound. In some instances, the remote system 102 sends a third data packet that includes the third video data 132, the third audio data 134, and/or the third timestamp data 136. In other instances, the remote system 102 may separately send the third video data, the third audio data, and/or the third timestamp data 136 to the display device 106.

The display device 106 may receive the data (and/or the third data packet) from the remote system 102. Using the third video data 132, the display device 106 may display image(s) representing the second state of the application. For example, and again using the example where the application includes the gaming application, the display device 106 may display the object located at the second position within the gaming environment. In some instances, the display device 106 may further output the sound represented by the third audio data 134. In some instances, the display device 106 displays the image(s) and/or outputs the sound according to the time(s) represented by the third timestamp data 136.

In some instances, the remote system 102 may additionally send, to the control device 104, data representing the second state of the application. The data may include fourth audio data 134 representing sound corresponding to the second state of the application and/or fourth timestamp data 136 representing a time for outputting the sound. In some instances, the remote system 102 sends a fourth data packet that includes the fourth audio data 134 and/or the fourth timestamp data 136. In other instances, the remote system 102 sends the fourth audio data separately from the fourth timestamp data 136. In either instance, the control device 104 may then output the sound represented by the fourth audio data 134. In some instances, the control device 104 may output the sound according to the time represented by the fourth timestamp data 136. In some instances, third timestamp data 136 and/or the fourth timestamp data 136 synchronizes the outputting of the sound by the display device 106 with the displaying of the image(s) by the display device 106.

In some instances, the remote system 102 may continue to receive input data 130 from the control device 104. The processing component 140 may then continue to process the input data 130 in order to update the state of the application. Based at least in part on the updating, the remote system 102 may continue to send, to the display device 106, data (e.g., video data 132, audio data 134, timestamp data 136, etc.) representing the current state of the application. In some instances, the remote system 102 sends the data to the display device 106 as a data packet. The remote system 102 may further send, to the control device, data (e.g., audio data 134, timestamp data 136, etc.) representing the current state of the application. In some instances, the remote system 102 sends the data to the control device 104 as part of a data packet.

As further illustrated in FIG. 1, the remote system 102 may include a speech-processing system 142 that includes an automatic speech recognition (ASR) component 144 and a natural language understanding (NLU) component 146. In some instances, the input data 130 received from the control device 104 may include audio data representing user speech from the user 110. For example, the control device 104 may include at least one microphone that captures the user speech from the user 110. The control device 104 may then generate the audio data that represents the user speech and the send the audio data (e.g., input data 130) to the remote system 102. In instances where the input data 130 includes audio data, the ASR component 144 may analyze the audio data in order to generate text data representing the user speech.

The NLU component 146 may then use the text data to make a semantic interpretation of the text. That is, the NLU component 146 determines the meaning behind the text based on the individual words and then implements that meaning. The NLU component 146 interprets a text string to derive an intent or a desired action from the user 110 as well as the pertinent pieces of information in the processing component 140 to determine how to update the current state of the application. For example, if the user speech that is processed using the ASR component 144 includes the text "move the object forward", then the NLU component 146 may determine that the user 110 intended that the object is to move forward within the environment. The processing component 140 may then use the intent to update the state of the application, similar to the processes described above.

In examples, some or each of the components and/or systems of the remote system 102 may include their own processor(s), network interface(s), and/or memory. As such, by way of example, an application system 148 may include and/or be associated with processor(s), network interface(s), and/or memory. Additionally, the speech-processing system 142 may include and/or be associated with different processor(s), network interface(s), and/or memory, or one or more of these components may utilize some or all of the same processor(s), network interface(s), and/or memory utilized by the application system 148. These components are described in detail herein. Additionally, the operations and/or functionalities associated with and/or described with respect to the components of the remote system 102 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

Figure 2:
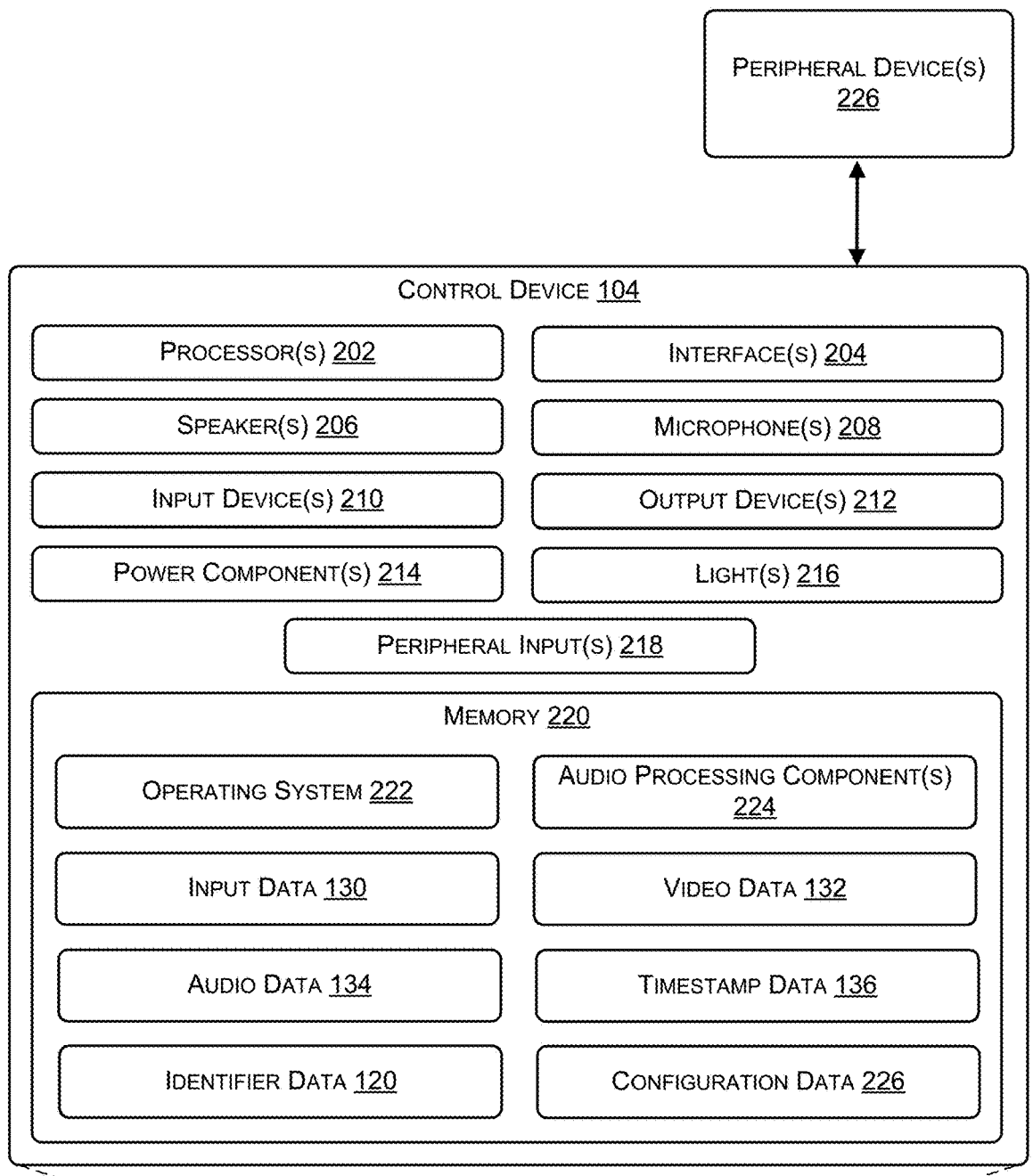
FIG. 2 illustrates a block diagram of an example architecture of a control device that is configured to communicate with a remote system.
Figure 2:
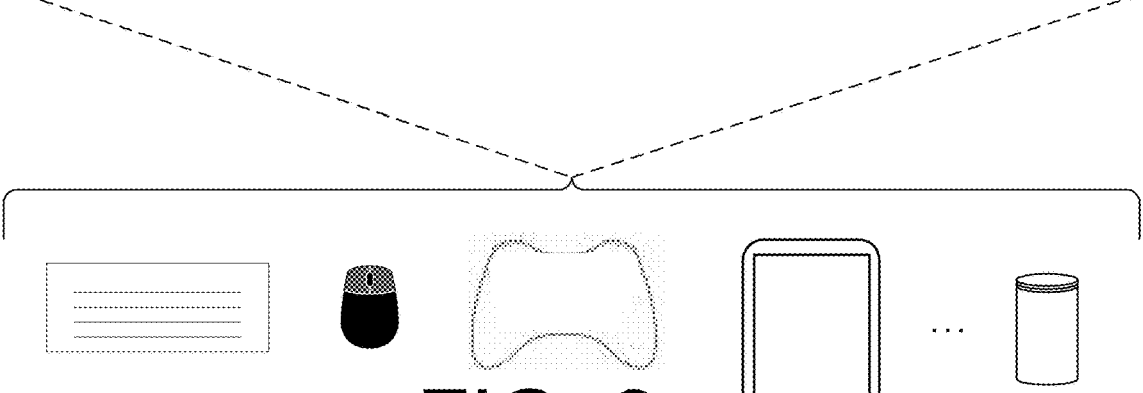

FIG. 2 illustrates a block diagram of an example architecture of the control device 104, which is configured to communicate with the remote system 102. As shown, the control device 104 includes one or more processors 202, one or more network interfaces 204, one or more speakers 206, one or more microphones 208, one or more input devices 210, one or more output devices 212, one or more power components 214, one or more lights 216, one or more peripheral inputs 218, and memory 220. In some instances, the control device 104 may include one or more additional components no illustrated in the example of FIG. 2. In some instances, the control device 104 may not include one or more the speaker(s) 206, the microphone(s) 208, the input device(s) 210, the output device(s) 212, the light(s) 216, or the peripheral input(s) 218.

Although the control device 104 is illustrated as having one or more integral speaker(s) 206, in other examples, the control device 104 may not include speaker(s) 206. For example, the control device 104 may produce an audio output signal that drives an external loudspeaker, such as headphones connected to the control device 104 via a peripheral input 218. As another example, the control device 104 may drive or control an external loudspeaker through a wireless data connection such as a Bluetooth connection. In other situations, the control device 104 may be used in conjunction with a loudspeaker device that receives audio data and other instructions from the remote system 102, rather than from the control device 104.

The microphone(s) 208 may include sensors (e.g., transducers) configured to receive sound. The microphone(s) 208 may generate input signals for audio input (e.g., sound). For example, the microphone(s) 208 may determine digital input signals for an utterance of a user. In some instances, the microphone(s) 208 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 2112) to receive sound from four directions. The microphone(s) 208 may be in a planar configuration, or positioned apart in a non-planar three-dimensional region. In some instances, the microphone(s) 208 may include a spatially disparate array of sensors in data communication. For example, a networked array of sensors may be included. The microphone(s) 208 may include omni-directional microphones, directional microphones (e.g., shotgun microphones), and so on.

In some instances, the microphone(s) 208 and the speaker(s) 206 facilitate interactions, such as dialogue, with a user. The microphone(s) 208 produce audio data representing sound from the environment of the control device 104, such speech utterances by the user. The audio data produced by the microphone(s) 208 may comprise directional audio signals or may be used to produce directional audio signals, where each of the directional audio signals emphasizes audio from a different radial direction relative to the microphone(s) 208.

The input device(s) 210 may include button(s), key(s), joystick(s), touch-sensitive pad(s), trigger(s), sensor(s) that detect movement of the control device 104 (e.g., accelerometer(s), magnetometer(s), etc.), and/or any other type of device that is able to receive input from the user. The output device(s) 212 may include devices that provide feedback to the user. For instance, the output device(s) 210 may include haptic driver(s) that cause actuator(s) to activate.

The power component(s) 214 may be configured to provide power to the control device 104. For a first example, power component(s) 214 may include one or more batteries. For a second example, the power component(s) 214 may include components connected to a source of external AC (alternating-current) power, such as a household AC power supply (alternatively referred to herein as "AC mains" or "wall power").

The light(s) 216 may include visual indicator(s) (e.g., light-emitting diodes (LEDs)) that emit light when activated by the control device 104. In some instances, the visual indicator(s) may include a light ring disposed on a portion of the control device 104. In other instances, the visual indicator(s) may be disposed on various portions on the control device 104. The peripheral input(s) 218 may include one or more components for connecting peripheral devices to the control device 104. For instance, a peripheral input 218 may include a jack for connecting headphones to the control device 104.

The control device 104 may include memory 220. The memory 220 may be used to store any number of software components that are executable by the processor(s) 202. Software components stored in the memory 220 may include an operating system 222 that is configured to manage hardware and services within and coupled to the control device 104. In addition, executable components stored by the memory 220 may include audio processing component(s) 224 configured to produce audio data using the microphones 208. The audio processing component(s) 224 may include functionality for processing microphone audio data generated by the microphone(s) 208 and/or output audio data provided to the speaker(s) 206. As an example, the audio processing component(s) 224 may include an acoustic echo cancellation or suppression component for reducing acoustic echo generated by acoustic coupling between the microphone(s) 208 and the speaker(s) 206. The audio processing components 224 may also include a noise reduction component for reducing noise in received audio data, such as elements of microphone audio data other than user speech.

Additionally, the audio processing component(s) 224 may include a wakeword detection component that monitors audio signals to detect user utterances of the system of the trigger expression. Wakeword detection may be implemented using keyword spotting technology, as an example.

As further illustrated in FIG. 2, the memory 220 may include the input data 130 generated by the control device 104, where the control device 104 sends the input data 130 to at least the remote system 102. Additionally, the memory 220 may include the video data 132, the audio data 134, and/or the timestamp data 136 that the control device 104 receives from the remote system 102. Additionally, the memory 220 may store the identifier data 120 that the control device 104 may send to the remote system 102.

As further illustrated in FIG. 2, the memory 220 may store configuration data 226. The control device 104 may use the configuration data 226 to establish a connection with a network, such as the network 108. For instance, the configuration data 226 may represent an SSID and a password.

As further illustrated in FIG. 2, the electronic device 104 may be connected to peripheral device(s) 226. The peripheral device(s) 226 may include, but are not limited to, headphones, speaker(s), display(s), input device(s) (e.g., keyboard, mouse, button(s), etc.), and/or the like. In some instances, the electronic device 104 includes a wired connection with the peripheral device(s) 226. For example, the peripheral device(s) 226 may connect to the peripheral input(s) 218. In some instances, the electronic device 104 includes a wireless connection with the peripheral device(s) 226. For example, the electronic device 104 may communicate with the peripheral device(s) 226 over a network.

Although the example of FIG. 2 illustrates the peripheral device(s) 226 as being separate from the electronic device 104, in other instances, the electronic device 104 may include the peripheral device(s) 226. For example, the electronic device 104 may include headphones.

Figure 3:
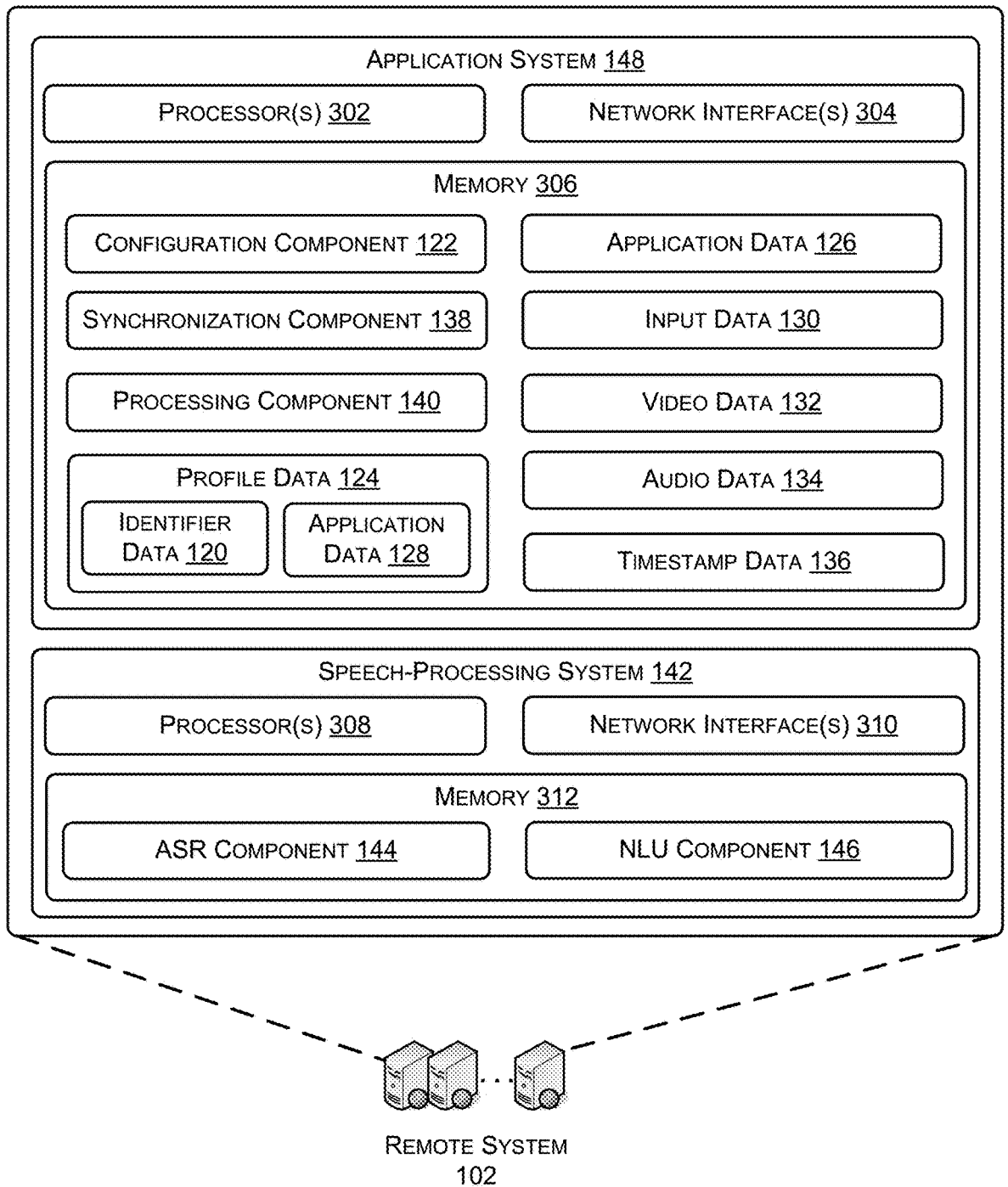
FIG. 3 illustrates a block diagram of an example architecture of a remote system that is configured to communicate with a control device and a display device.

FIG. 3 illustrates a block diagram of an example architecture of the remote system 102 that is configured to communicate with the control device 104 and the display device 106. As shown, the application system 148 may include processor(s) 302, network interface(s) 304, and memory 306. Additionally, the speech-processing system 142 may include processor(s) 308, network interface(s) 310, and memory 312.

As used herein, a processor, such as the processor(s) 202, processor(s) 302, and/or processor(s) 308 may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) 202, processor(s) 302, and/or processor(s) 308 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 202, processor(s) 302, and/or processor(s) 308 may possess its own local memory, which also may store program components, program data, and/or one or more operating systems.

The memory 220, the memory 306, and/or the memory 312 may include volatile and nonvolatile memory, removable and non-removable media implemented in any method or technology for storage of information, such as computer-readable instructions, data structures, program component, or other data. The memory 220, the memory 306, and/or the memory 312 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 220, the memory 306, and/or the memory 312 may be implemented as computer-readable storage media ("CRSM"), which may be any available physical media accessible by the processor(s) processor(s) 202, the processor(s) 302, and/or the processor(s) 308 to execute instructions stored on the memory 220, the memory 306, and/or the memory 312. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as the memory 220, the memory 306, and/or the memory 312, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 204, the network interface(s) 304, and/or the network interface(s) 312 may enable messages between the remote system 102, the control device 104, the display device 106, and/or with one or more other remote systems, as well as other networked devices. The network interface(s) 204, the network interface(s) 304, and/or the network interface(s) 310 may include one or more network interface controllers (NICs) or other types of transceiver devices to send and receive messages over the network 108.

For instance, each of the network interface(s) 204, the network interface(s) 304, and/or the network interface(s) 310 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 204, the network interface(s) 304, and/or the network interface(s) 310 may include a wide area network (WAN) component to enable message over a wide area network.

Figure 4:
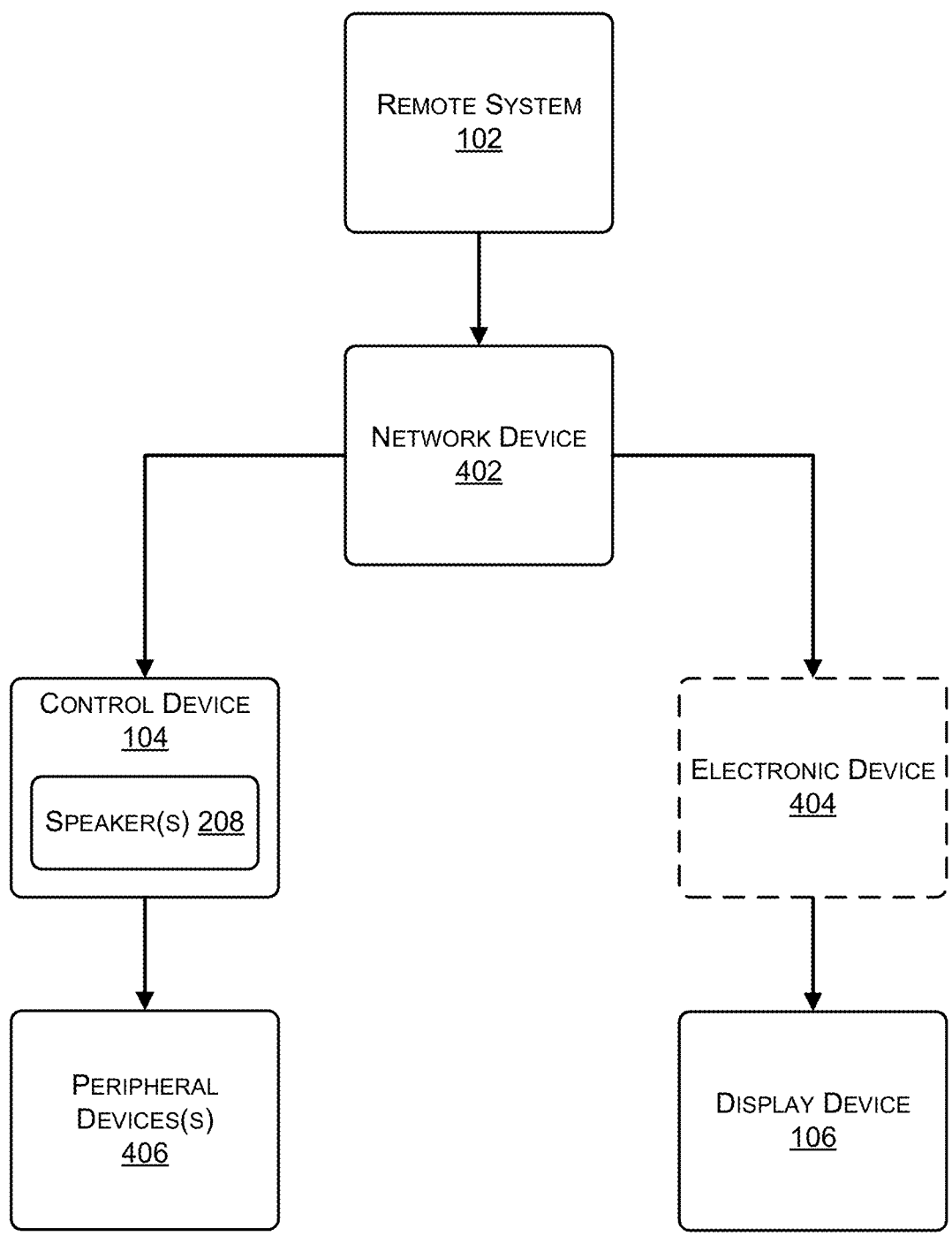
FIG. 4 illustrates a block diagram of an example of synchronizing data sent to a control device with data sent to a display device.

FIG. 4 illustrates a block diagram of an example of synchronizing data sent to the control device 104 with data sent to the display device 106. In the example of FIG. 4, the control device 104 may establish a network connection with a network device 402, such as an access point. Additionally, the display device 106 may be connected to an electronic device 404, where the electronic device 404 includes network interface(s) for establishing a network connection with the network device 402. However, in other examples, the electronic device 404 may be included within the display device 106. Still, in other examples, the display device 106 may include network interface(s) for establishing the network connection with the network device 402 (e.g., the electronic device 404 would not be included in the example of FIG. 4).

The remote system 102 may send at least audio data 134 and first timestamp data 136 to the control device 104. In some instances, the remote system 102 sends the audio data 134 and the first timestamp data 136 as part of a first data packet. The audio data 134 may represent sound corresponding to a state of an application. For instance, if the application is a gaming application, then the audio data 134 may represent sound corresponding to a state of the game. The first timestamp data 136 may represent a first instruction to output the sound represented by the audio data 134 at a first time.

Additionally, the remote system 102 may send at least video data 132 and/or second timestamp data 136 to the control device 104. In some instances, the remote system 102 sends the video data 132 and/or the second timestamp data 136 as part of a second data packet. The video data 132 may represent image(s) corresponding to the state of the application. The second timestamp data 136 may represent a second instruction to display the image(s) represented by the video data 132 at a second time. In some instances, the second time may be similar to (e.g., include) the first time. In other instances, the second time may be within a threshold period of time to the first time.

In the example of FIG. 4, the control device 104 may store the audio data 134 and the first timestamp data 136 in the memory 220. The control device 104 may then determine when a current time includes the first time represented by the first timestamp data 136. Based at least in part on the determination, the control device 104 may cause the sound represented by the audio data 134 to be output. In some instances, to cause the sound to be output, the control device 104 may output the sound using the speaker(s) 206. Additionally, or alternatively, in some instances, to cause the sound to be output, the control device 104 may send the audio data 134 to peripheral device(s) 406, where the peripheral device(s) 406 include speaker(s) for outputting the sound. For example, the control device 104 may be connected to headphones (e.g., a peripheral device 406). In such an example, the control device 104 may send the audio data 134 to the headphones, which may output the sound.

Additionally, the display device 106 may display the image(s) represented by the video data 132. In some instances, such as when the remote system 102 does not send the second timestamp data 136 to the display device 106, the display device 106 may begin displaying the image(s) as the display device 106 is receiving the video data 132. In other instances, such as when the remote system 102 does send the second timestamp data 136, the display device 106 may store the video data 132 in memory. The display device 106 may then determine when a current time includes the second time represented by the second timestamp data 136. Based at least in part on the determination, the display device 106 may begin displaying the image(s).

In the example of FIG. 4, the control device 104, the display device 106, the network device 402, the electronic device 404, and the peripheral device(s) 406 may be located within an environment, such as the user's home. Additionally, the remote system 102 may be located remote from the environment. However, in other examples, one or more of the display device 106, the network device 402, the electronic device 404, and the peripheral device(s) 406 may be located remote from the environment.

Figure 5:
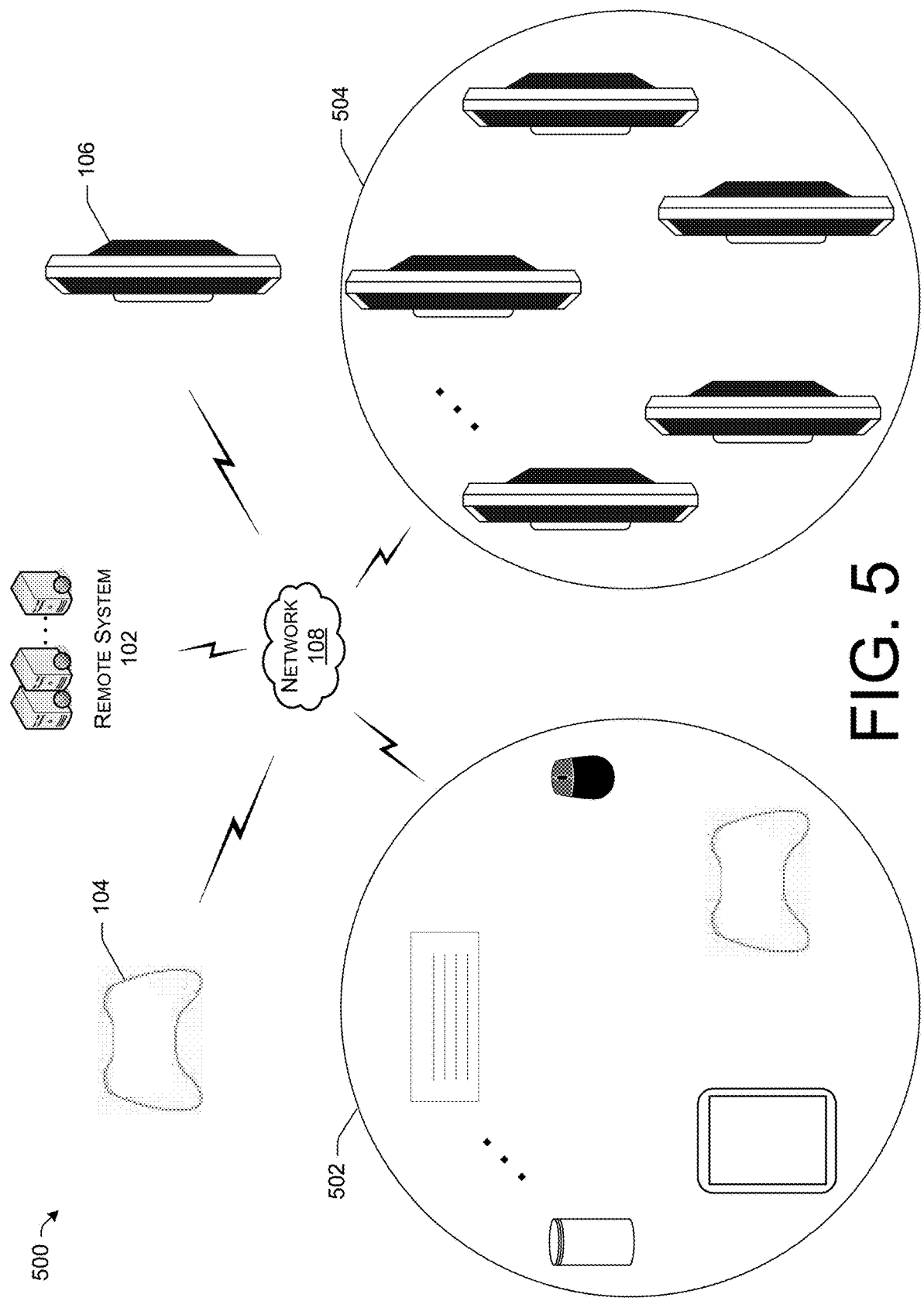
FIG. 5 illustrates a schematic diagram of an example system for communicating with multiple controlling devices and display devices in a network.

FIG. 5 illustrates a schematic diagram of an example system 500 for communicating with multiple controlling devices and display devices in a network. The system 500 may include, for example, the remote system 102, the control device 104, the display device 106, one or more additional control devices 502, and one or more additional display devices 504. In the example of FIG. 5, the remote system 102 may receive, over the network 108, input data 130 from the control device 104. The remote system 102 may then update, using the input data 130, a local state of an application that is associated with the control device 104. Additionally, the remote system 102 may send, to the display device 106 and over the network 108, video data 132, audio data 134, and/or timestamp data 136 that represents the local state of the application associated with the control device 104. Furthermore, the remote system 102 may send, over the network 108 and to the one or more display devices 504, data representing the current local state of the application associated with the control device 104.

The remote system 102 may also perform similar processes for each of the other one or more other control devices 502. For example, the remote system 102 may receive, over the network 108, input data 130 from a control device 502. The remote system 102 may then update, using the input data 130, a local state of an application that is associated with the control device 502. Additionally, the remote system 102 may send, to a display device 504 (associated with the control device 502) and over the network 108, video data 132, audio data 134, and/or timestamp data 136 that represents the local state of the application associated with the control device 502. Furthermore, the remote system 102 may send, over the network 108 and to the display device 106 and/or one or more other display devices 504, data representing the current local state of the application associated with the control device 502.

In some instances, such as when the application includes a gaming application, the remote system 102 may store an authoritative version of the environment of the game. The remote system 102 may then use the input data 130 from the control devices to update the positions of objects (e.g., characters, vehicles, buildings, etc.) within the environment. As such, the data representing a local state of the application that is associated with a control device, such as the control device 104, may represent the position(s) of object(s) that are controlled by the control device. The remote system 102 sends this data to the display device 106 and/or the one or more display device 504 such that the display device 106 and/or the one or more display devices 504 can update the position(s) of the object(s).

For example, a first local state of the application associated with the control device 104 may be different than a second local state of the application associated with the control device 502. For example, such as during a multiplayer network game, first local state of the application associated with the control device 104 may represent a first position of a first object within a gaming environment, where the control device 104 is configured to control the first object. As such, the display device 106 may be displaying image(s) that represent the first local state of the application. Additionally, the second local state of the application associated with the control device 502 may represent a second position of a second object within the gaming environment, where the control device 502 is configured to control the second object. As such, the display device 504 (associated with the control device 502) may be displaying image(s) that represent the second local state of the application.

In such instances, when the remote system 102 updates the second local state of the application associated with the control device 502, such as by changing the position of the second object within the gaming environment, the remote system 102 may further update the first local state of the application to include the updated position of the second object. As such, the first local state of the application may represent both the first position of the first object and the updated position of the second object.

Although the above examples include network applications with multiple users, in other instances, the control device 104 may be associated with both the display device 106 and one or more of the display devices 504. For example, as the remote system 102 is receiving the input data from the control device 104 and updating the state of an application using the input data, the remote system 102 may be sending, over the network 104, data (e.g., video data, audio data, timestamp data, etc.) to the display device 106 and a second display device 504. In some instances, the data sent to the display device 106 may be the same as the data that is sent to the second display device 504. For example, the display device 106 and the second display device 504 may be displaying similar content (e.g., image(s) representing a state of the application). Additionally, the display device 106 and the second display device 504 may be receiving similar timestamp data that causes the display device 106 and the second display device 504 to synchronize displaying of the content.

In some instances, the data sent to the display device 106 may be different than the data that is sent to the second display device 504. For example, the display device 106 and the second display device 504 may operate as a "split-screen" where the display device 106 displays a first portion of the content and the second display device 504 displays a second portion of the content. Additionally, the display device 106 and the second display device 504 may be receiving similar timestamp data that causes the display device 106 and the second display device 504 to synchronize displaying of the content.

In some instances, the control device 104 and one or more other control devices 502 may be associated with the display device 106. For example, a first user may be using the control device 104 to control the application while a second user is using a second control device 502 to control the application. For instance, the remote system 102 may be receiving, over the network 108, data (e.g., input data) from each of the control device 104 and the second control device 502. The remote system 102 may then update the state of the application using the data that is received from each of the control device 104 and the second control device 106. Additionally, the remote system 102 may be sending, over the network 108, data (e.g., video data, audio data, timestamp data, etc.) to the display device 106 that represents the current state of the application.

In some instances, and in each of the examples described above, the control device 104 and one or more of the control devices 502 may be located in the same environment and/or the display device 106 and/or one or more of the display devices 504 may be located in the same environment. In some instances, and in each of the examples described above, the control device 104 and one or more of the control devices 502 may be located in separate environments and/or the display device 106 and/or one or more of the display devices 504 may be located in separate environments.

In the example of FIG. 5, the one or more control devices 502 and/or the one or more display devices 504 may respectively be similar to the control device 104 and/or the display device 106. In other examples, one or more of the control devices 502 and/or one or more of the display devices 504 may respectively be different than the control device 104 and/or the display device 106. For example, one or more of the control devices 502 may correspond to a video game console that processes inputs from a user. After processing the inputs, the video game console may send data to the remote system 102, where the data represents changes the local state of the application.

FIGS. 6A-9 illustrate various processes for controlling network applications. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 6A:
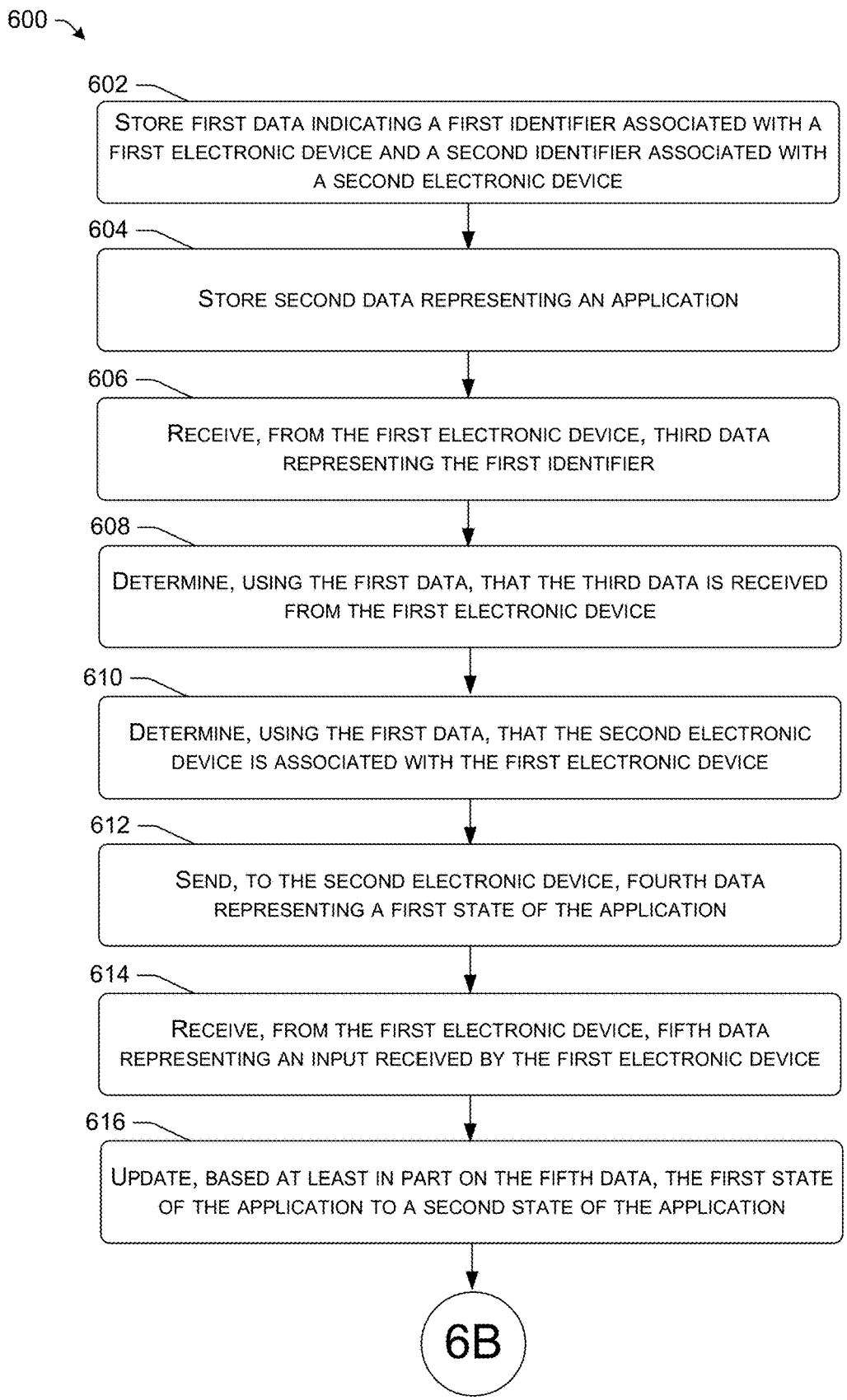
FIGS. 6A-6B illustrate an example process for controlling network applications.
Figure 6B:
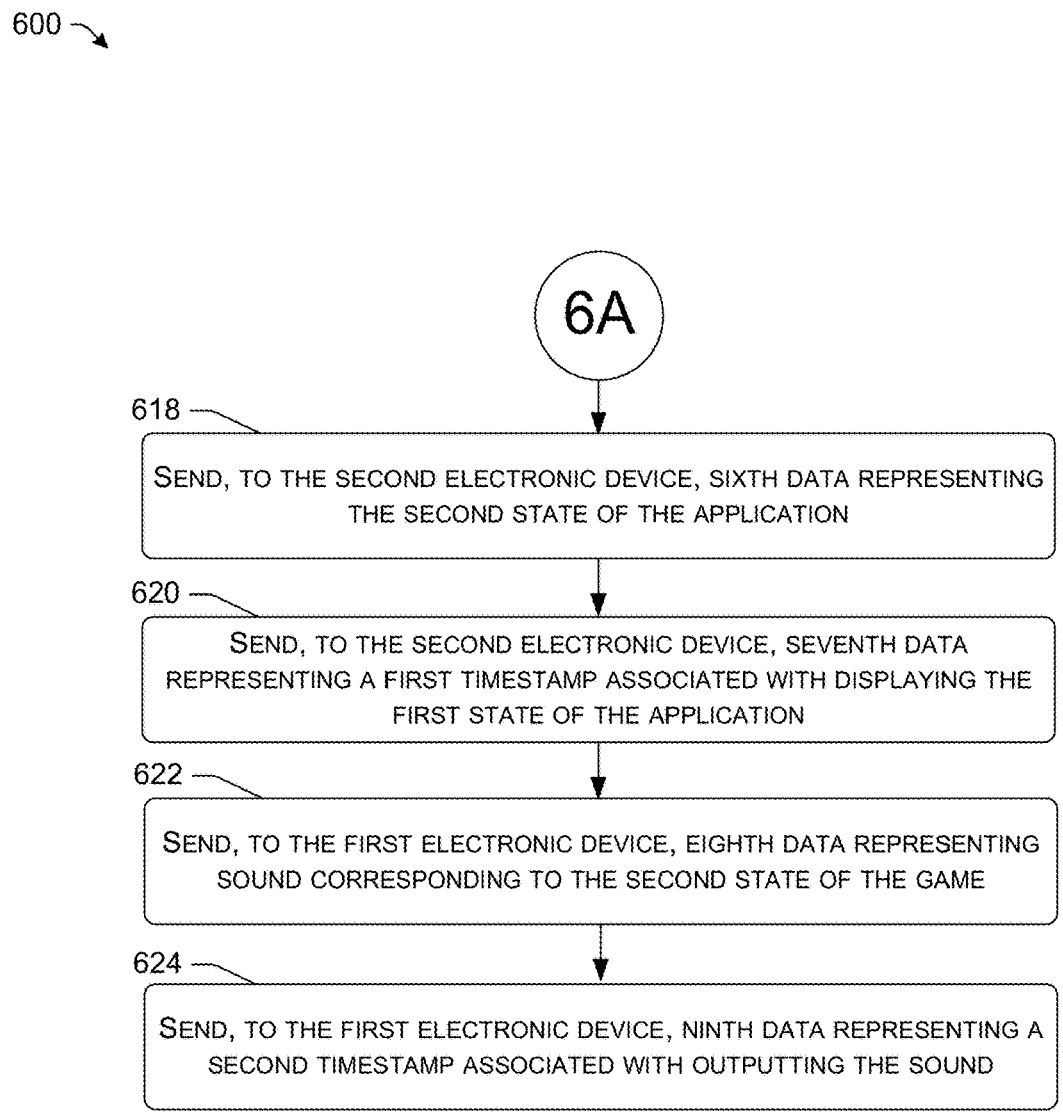

FIGS. 6A-6B illustrate an example process for controlling network applications. At 602, the process 600 may include storing first data indicating a first identifier associated with a first electronic device and a second identifier associated with a second electronic device. For instance, the remote system 102 may store the first data representing the first identifier associated with the first electronic device (e.g., the control device 104) and the second identifier associated with the second electronic device (e.g., the display device 106). In some instances, the first data may include user profile data that includes and/or is associated with first identifier data representing the first identifier and second identifier data representing the second identifier. In some instances, the remote system 102 receives the first data during a configuration process of first electronic device and/or the second electronic device.

At 604, the process 600 may include storing second data representing an application. For instance, the remote system 102 may store the second data representing the application. As described herein, the application can include, but is not limited to, a gaming application, a word processing application, an educational application, a multimedia application (e.g., movie, music, etc.), and/or any other type of application that is capable of being accessed via a network.

At 606, the process 600 may include receiving, from the first electronic device, third data representing the first identifier. For instance, the remote system 102 may receive the third data (e.g., identifier data) from the first electronic device, where the third data represents the first identifier. In some instances, the remote system 102 receives the third data based at least in part on the first electronic device connecting to the network.

At 608, the process 600 may include determining, using the first data, that the third data is received from the first electronic device. For instance, the remote system 102 may determine, using the first data, that the third data is received from the first electronic device. In some instances, the remote system 102 may make the determination based at least in part on matching the first identifier represented by the first data to the first identifier represented by the third data.

At 610, the process 600 may include determining, using the first data, that the second electronic device is associated with the first electronic device. For instance, the remote system 102 may determine, using the first data, that the second electronic device is associated with the first electronic device. In some instances, such as when the first data includes the user profile data, the remote system 102 may determine that the user profile data includes and/or is associated with both the first identifier data representing the first identifier and the second identifier data representing the second identifier of the second electronic device. Based at least in part on the determination, the remote system 102 may determine that the second electronic device is associated with the first electronic device.

At 612, the process 600 may include sending, to the second electronic device, fourth data representing a first state of the application. For instance, the remote system 102 may send, to the second electronic device, the fourth data representing the first state of the application. The fourth data may include a data packet, where the data packet includes video data representing image(s) corresponding to the first state of the application, audio data representing sound corresponding to the first state of the application, and/or timestamp data representing an instruction to display the first state of the application at a specific time and/or an instruction to output the sound at a specific time. In some instances, such as when the application includes a gaming application, the first state of the application may include an object (e.g., a character) located at a first position within a gaming environment.

At 614, the process 600 may include receiving, from the first electronic device, fifth data representing an input received by the first electronic device. For instance, the remote system 102 may receive, from the first electronic device, the fifth data (e.g., input data) representing the input received by the first electronic device. In some instances, the input may be received by the first electronic device using button(s), key(s), joystick(s), touch-sensitive pad(s), trigger(s), sensor(s), and/or the like. In some instances, the input may include audio data representing sound captured by microphone(s) of the first electronic device.

At 616, the process 600 may include updating, based at least in part on the fifth data, the first state of the application to a second state of the application. For instance, the remote system 102 may use the fifth data to update the first state of the application to the second state of the application. For example, and again if the application includes a gaming application, the input may correspond to a movement of the object. As such, the remote system 102 may update the first state of the application to the second state of the application by moving the object from the first position within the gaming environment to a second position within the gaming environment.

At 618, the process 600 may include sending, to the second electronic device, sixth data representing the second state of the application. For instance, the remote system 102 may send, to the second electronic device, the sixth data representing the second state of the application. The sixth data may include a data packet, where the data packet includes video data representing image(s) corresponding to the second state of the application and/or audio data representing sound corresponding to the second state of the application.

At 620, the process 600 may include sending, to the second electronic device, seventh data representing a first timestamp associated with displaying the second state of the application. For instance, the remote system 102 may send, to the second electronic device, the seventh data representing the first timestamp associated with displaying the second state of the application. In some instances, the seventh data may include timestamp data representing an instruction to display the second state of the application at a specific time and/or an instruction to output the sound at a specific time. In some instances, the seventh data is included in the same data packet that also includes the sixth data.

At 622, the process 600 may include sending, to the first electronic device, eighth data representing sound corresponding to the second state of the application. For instance, the remote system 102 may send, to the first electronic device, the eighth data representing the sound corresponding to the second state of the application. The sixth data may include a data packet, where the data packet includes at least audio data representing the sound corresponding to the second state of the application.

At 624, the process 600 may include sending, to the first electronic device, ninth data representing a second timestamp associated with outputting the sound. For instance, the remote system 102 may send, to the first electronic device, the ninth data representing the second timestamp associated with outputting the sound. In some instances, the ninth data may include timestamp data representing an instruction to output the sound at a specific time. For instance, the ninth data may synchronize the outputting of the sound by the first electronic device with the displaying of the second state of the application by the second electronic device. In some instances, the ninth data is included in the same data packet that also includes the audio data (e.g., included within the eighth data).

Figure 7:
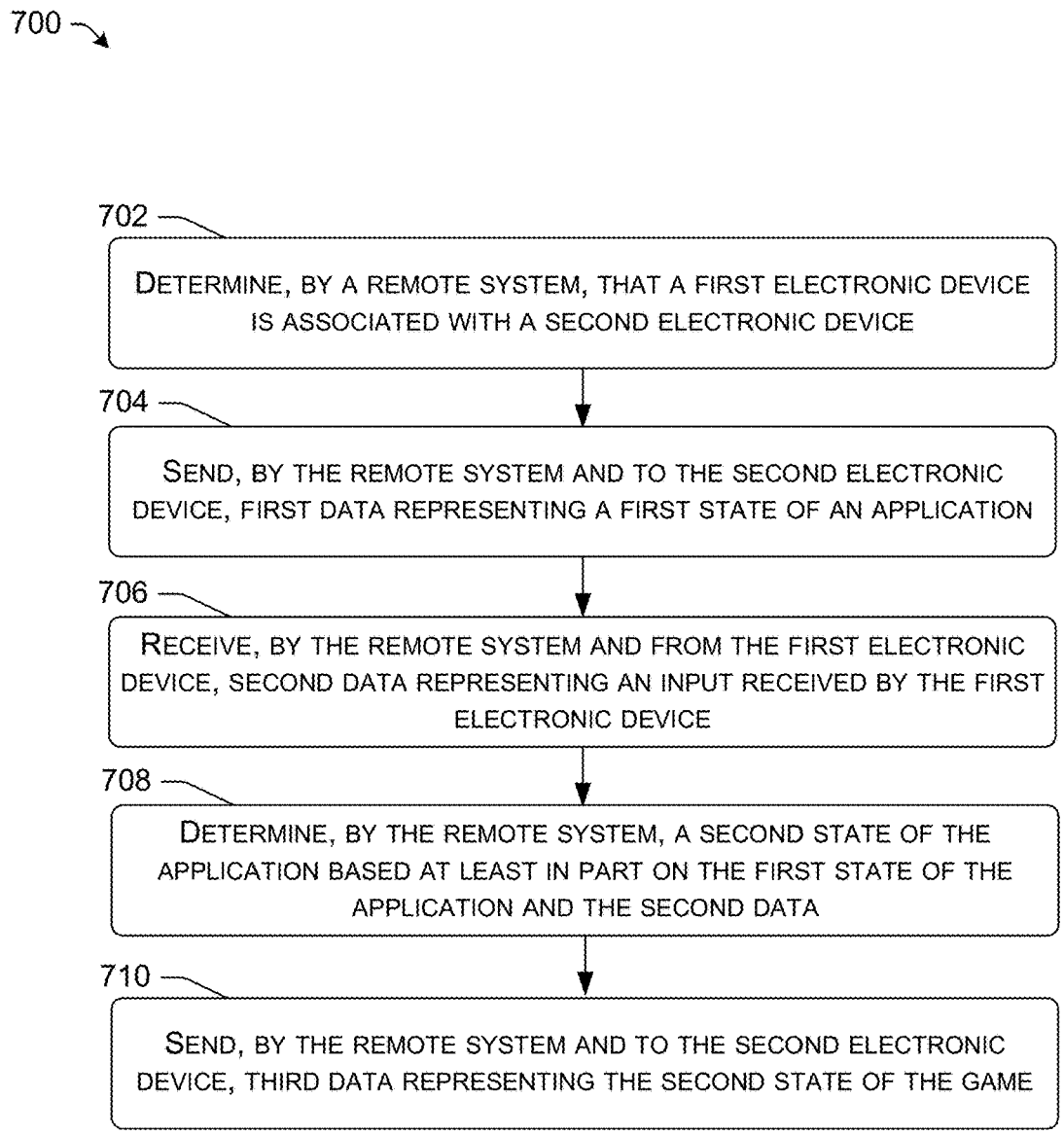
FIG. 7 illustrates a first example process of a remote system communicating with a control device and a display device in order to control a network application.

FIG. 7 illustrates a first example process 700 of a remote system communicating with a control device and a display device in order to control a network application. At 702, the process 700 may include determining, by a remote system, that a first electronic device is associated with a second electronic device. For instance, the remote system 102 may determine that the first electronic device (e.g., the control device 104) is associated with the second electronic device (e.g., the display device 106). In some instances, the remote system 102 may make the determination using user profile data. For instance, the user profile data may include and/or be associated with first identifier data associated with the first electronic device and second identifier data associated with the second electronic device.

At 704, the process 700 may include sending, by the remote system and to the second electronic device, first data representing a first state of the application. For instance, the remote system 102 may send, to the second electronic device, the first data representing the first state of the application. The first data may include a data packet, where the data packet includes video data representing image(s) corresponding to the first state of the application, audio data representing sound corresponding to the first state of the application, and/or timestamp data representing an instruction to display the first state of the application at a specific time and/or an instruction to output the sound at a specific time.

At 706, the process 700 may include receiving, by the remote system and from the first electronic device, second data representing an input received by the first electronic device. For instance, the remote system 102 may receive, from the first electronic device, the second data (e.g., input data) representing the input received by the first electronic device. In some instances, the input may be received by the first electronic device using button(s), key(s), joystick(s), touch-sensitive pad(s), trigger(s), sensor(s), and/or the like. In some instances, the second data may include audio data representing sound captured by microphone(s) of the first electronic device.

At 708, the process 700 may include determining, by the remote system, a second state of the application based at least in part on the first state of the application and the second data. For instance, the remote system 102 may determine the second state of the application based at least in part on the first state of the application and the second data. In some instances, such as when the application includes a gaming application, the first state of the application may include an object located at a first position within a gaming environment. In such instances, the remote system 102 may update the first position of the object to a second position based at least in part on the input. The remote system 102 may then determine the second state of the application as including the object located at the second position.

At 710, the process 700 may include sending, by the remote system and to the second electronic device, third data representing the second state of the application. For instance, the remote system 102 may send, to the second electronic device, the third data representing the second state of the application. The third data may include a data packet, where the data packet includes video data representing image(s) corresponding to the second state of the application, audio data representing sound corresponding to the second state of the application, and/or timestamp data representing an instruction to display the second state of the application at a specific time and/or an instruction to output the sound at a specific time.

Figure 8:
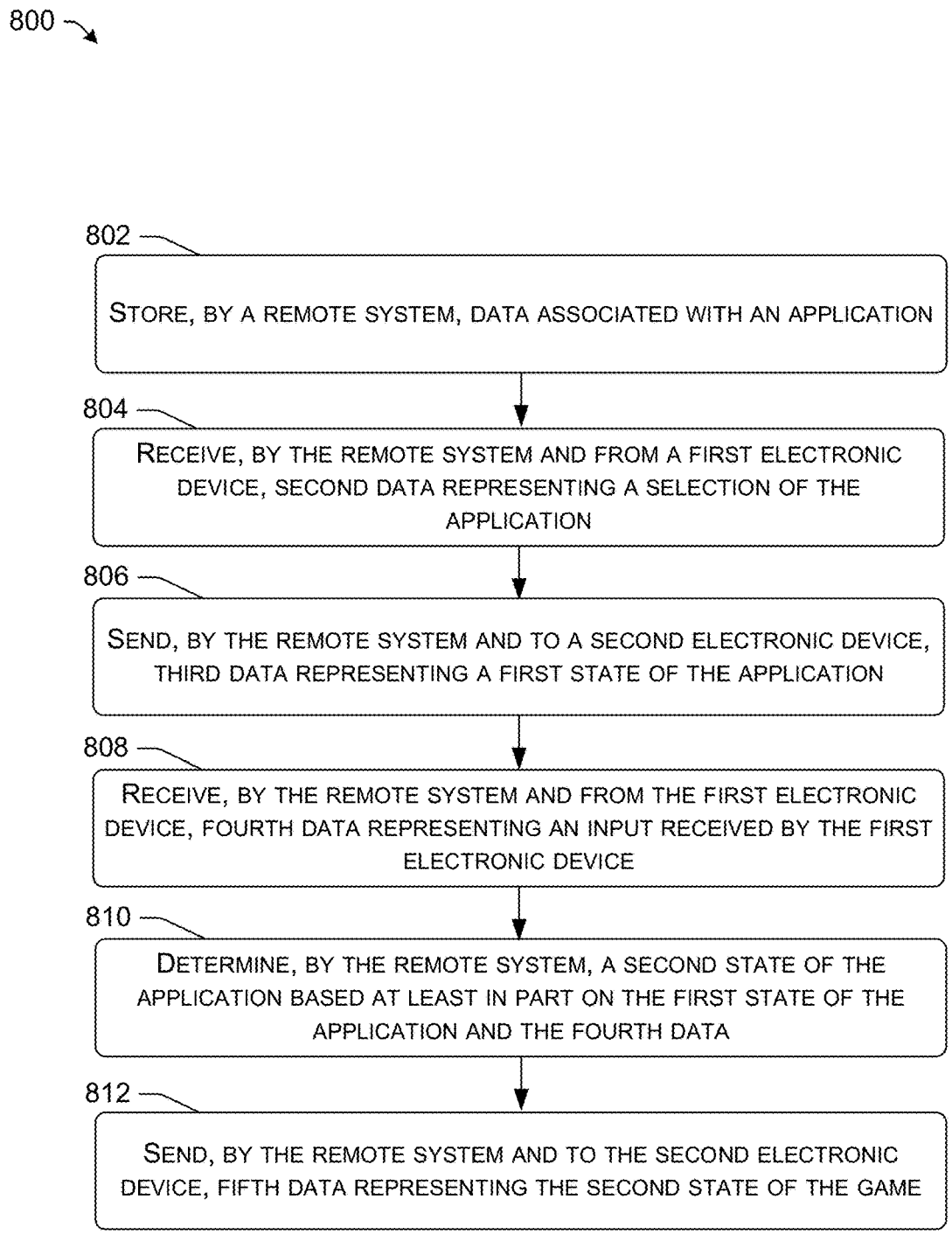
FIG. 8 illustrates a second example process of a remote system communicating with a control device and a display device in order to control a network application.

FIG. 8 illustrates a second example process 800 of a remote system communicating with a control device and a display device in order to control a network application. At 802, the process 800 may include storing, by a remote system, first data representing an application. For example, the remote system 102 may store the first data (e.g., application data) representing the application. As described herein, the application can include, but is not limited to, a gaming application, a word processing application, an educational application, a multimedia application (e.g., movie, music, etc.), and/or any other type of application that is capable of being accessed via a network.

At 804, the process may include receiving, by the remote system and from a first electronic device, second data representing a selection of the application. For instance, the remote system 102 may receive, from the first electronic device (e.g., the control device 104), the second data representing the selection of the application.

At 806, the process 800 may include sending, by the remote system and to a second electronic device, first data representing a first state of the application. For instance, the remote system 102 may send, to the second electronic device, the first data representing the first state of the application. The third data may include a data packet, where the data packet includes video data representing image(s) corresponding to the first state of the application, audio data representing sound corresponding to the first state of the application, and/or timestamp data representing an instruction to display the first state of the application at a specific time and/or an instruction to output the sound at a specific time.

At 808, the process 800 may include receiving, by the remote system and from the first electronic device, fourth data representing an input received by the first electronic device. For instance, the remote system 102 may receive, from the first electronic device, the fourth data (e.g., input data) representing the input received by the first electronic device. In some instances, the input may be received by the first electronic device using button(s), key(s), joystick(s), touch-sensitive pad(s), trigger(s), sensor(s), and/or the like. In some instances, the second data may include audio data representing sound captured by microphone(s) of the first electronic device.

At 810, the process 800 may include determining, by the remote system, a second state of the application based at least in part on the first state of the application and the fourth data. For instance, the remote system 102 may determine the second state of the application based at least in part on the first state of the application and the fourth data. In some instances, such as when the application includes a gaming application, the first state of the application may include an object located at a first position within a gaming environment. In such instances, the remote system 102 may update the first position of the object to a second position based at least in part on the input. The remote system 102 may then determine the second state of the application as including the object located at the second position.

At 812, the process 800 may include sending, by the remote system and to the second electronic device, fifth data representing the second state of the application. For instance, the remote system 102 may send, to the second electronic device, the fifth data representing the second state of the application. The fifth data may include a data packet, where the data packet includes video data representing image(s) corresponding to the second state of the application, audio data representing sound corresponding to the second state of the application, and/or timestamp data representing an instruction to display the second state of the application at a specific time and/or an instruction to output the sound at a specific time.

Figure 9:
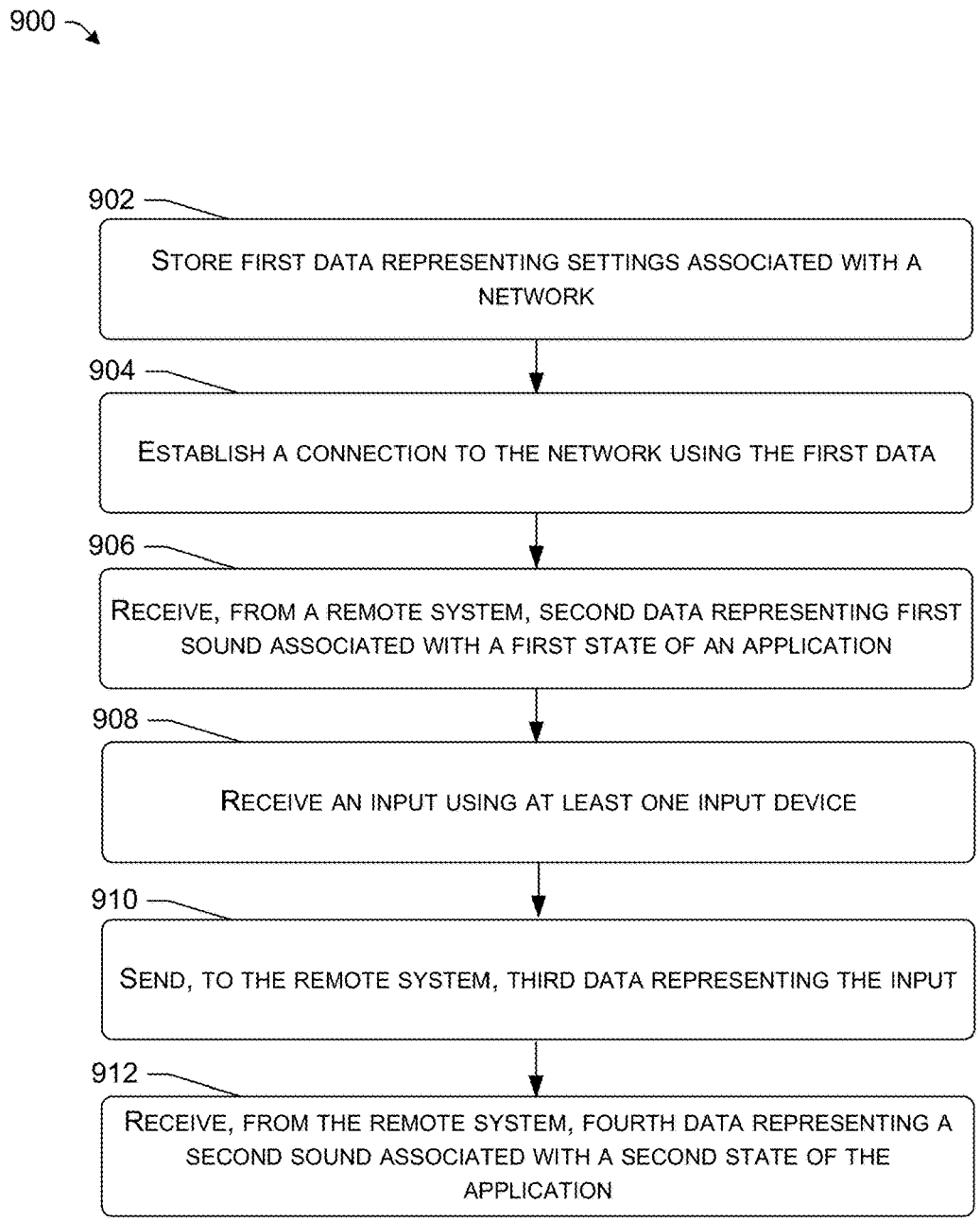
FIG. 9 illustrates an example process of a control device communicating with a remote system in order to control a network application.

FIG. 9 illustrates an example process 900 of a control device communicating with a remote system in order to control a network application. At 902, the process 900 may include storing first data representing settings associated with a network. For example, the control device 104 may store the first data (e.g., configuration data) representing the settings associated with the network. In some instances, the first data may include a SSID associated with a router and a password.

At 904, the process 900 may include establishing a connection to the network using the first data. For instance, the control device 104 may use the first data to establish the connection with the network.

At 906, the process 900 may include receiving, from a remote system, second data representing sound associated with a first state of an application. For instance, the control device 104 may receive, from the remote system 102, the second data (e.g., audio data) representing the sound associated with the first state of the application. In some instances, the control device 104 may further receive timestamp data representing a time for outputting the sound. The control device 104 may then cause the sound to be output. In some instances, the control device 104 outputs the sound using speaker(s). In some instances, the control device 104 sends the second data to a peripheral device for output of the sound.

At 908, the process 900 may include receiving an input using at least one input device. For instance, the control device 104 may receive the input using the at least one input device. In some instances, the at least one input device may include button(s), key(s), joystick(s), touch-sensitive pad(s), trigger(s), sensor(s), and/or the like. In some instances, the at least one input device may include microphone(s).

At 910, the process 900 may include sending, to the remote system, third data representing the input. For instance, the control device 104 may send, to the remote system 102, the third data (e.g., input data) representing the input.

At 912, the process 900 may include receiving, from the remote system, fourth data representing sound associated with a second state of the application. For instance, the control device 104 may receive, from the remote system 102, the fourth data (e.g., audio data) representing the sound associated with the second state of the application. In some instances, the control device 104 may further receive timestamp data representing a time for outputting the sound. The control device 104 may then cause the sound to be output. In some instances, the control device 104 outputs the sound using speaker(s). In some instances, the control device 104 sends the second data to a peripheral device for output of the sound.

Figure 10:
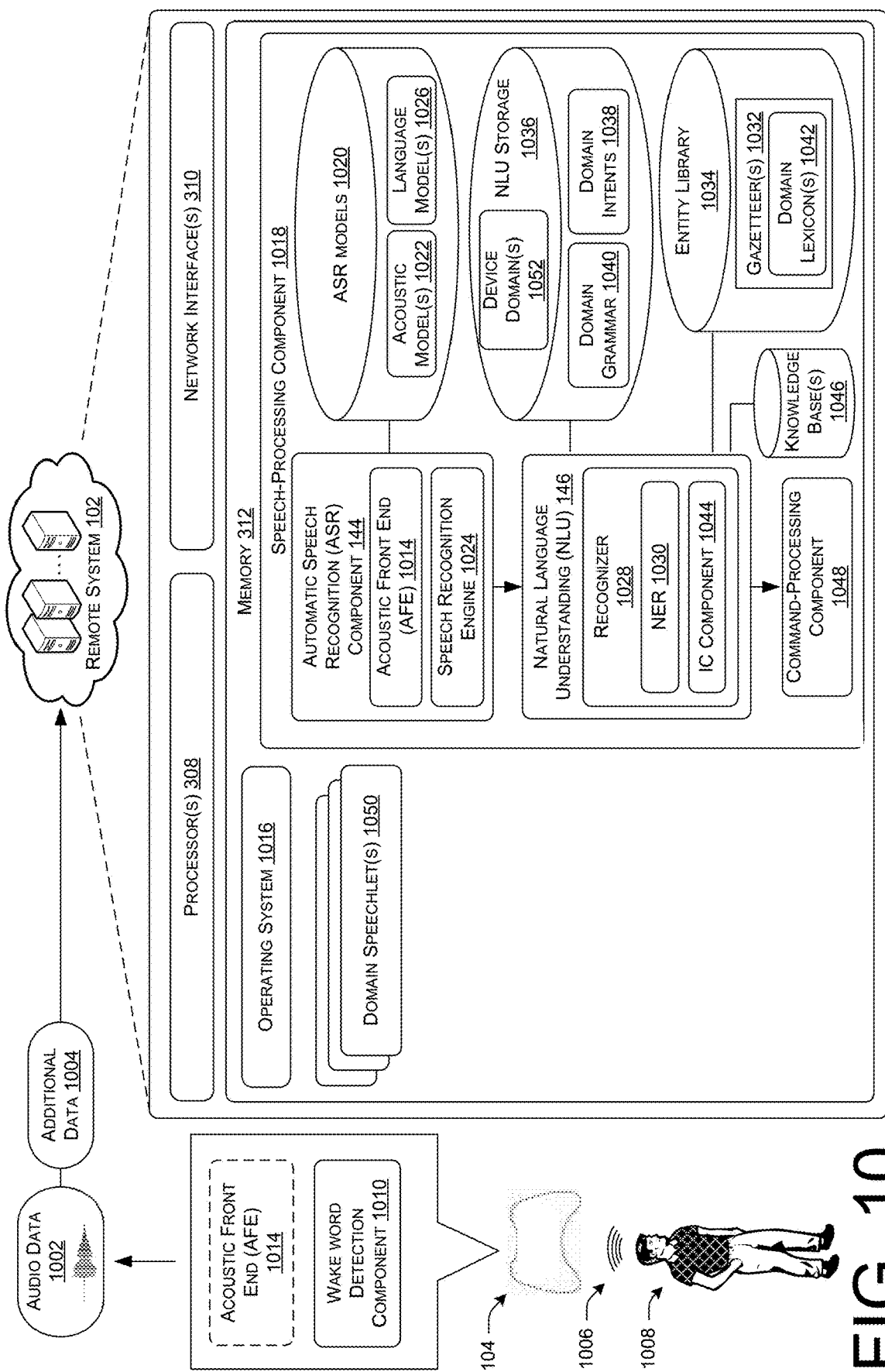
FIG. 10 illustrates a block diagram of an example architecture of a speech-processing system which receives audio data and/or additional data from a control device, and performs techniques to determine an intent of a user based on the audio data and/or additional data.

FIG. 10 illustrates a block diagram of an example architecture of a speech processing system which receives audio data and/or addition data from voice-enabled devices, such as the control device 104, and performs techniques to determine how to respond to a voice command of a user represented in the audio data. The block diagram of FIG. 10 illustrates an example architecture of a speech-processing system (e.g., remote system 102) which receives audio data 1002 and additional data 1004 (e.g., metadata such as timestamps, SRN values, etc.) from the control device 104, and performs techniques to determine an intent of the audio data 1002.

FIG. 10 includes a conceptual diagram of how a voice command 1006 can be processed, allowing a system to capture and execute commands spoken by a user 1008, such as spoken commands that may follow a wakeword. The various components illustrated may be located on a same or different physical devices. Communication between various components illustrated in FIG. 10 may occur directly, or across a network. An audio capture component, such as the microphone(s) 208 microphone of the control device 104, captures audio corresponding to a voice command 1006. The control device 104, using a wakeword detection component 1010, then processes the voice command 1006, or audio data corresponding to the voice command 1006, to determine if a keyword (such as a wakeword) is detected in the voice command 1006. Following detection of a wakeword, the control device 104 sends the audio data 1002 corresponding to the voice command 1006 to a computing device of the remote system 102 that includes the ASR component 144. The audio data 1002 may be output from an acoustic front end (AFE) 1014 located on the control device 104 prior to transmission. Or, the audio data 1002 may be in a different form for processing by a remote AFE 1014, such as the AFE 1014 located with the ASR component 144.

In various examples, the remote system 102 may include one or more processors 308 to power components, devices, and actions of the remote system 102, and one or more network interfaces 310 such as a wireless or Wi-Fi network communications interface, an Ethernet communications interface, a cellular network communications interface, a Bluetooth communications interface, etc., for communications by the remote system 102 over various types of networks (e.g., network(s) 108), including wide-area network, local-area networks, private networks, public networks etc. In the case of a wireless communications interfaces, such interfaces may include radio transceivers and associated control circuits and logic for implementing appropriate communication protocols.

The remote system 102 may include a speech-processing component 1018, which includes various components for processing a voice command 1006, such as the automatic speech recognition (ASR) component 144 and the natural language understanding (NLU) component 146. The various components illustrated may be located on a same or different physical devices.

In some examples, audio data (e.g., audio data 1002) may be received by the remote system 102 for speech processing for interpretation of the included voice command 1006 (either for purposes of enabling voice-communications and/or for purposes of executing a command in the speech). The audio data 1002 may include data corresponding to the wakeword, or the portion of the audio data corresponding to the wakeword may be removed by the control device 104 prior to sending. Upon receipt by the remote system 102, the ASR component 144 may convert the audio data into text. The ASR component 144 transcribes audio data into text data representing the words of the speech contained in the audio data. The text data may then be used by other components for various purposes, such as arbitration, executing system commands, inputting data, etc. A voice command 1006 in the audio data is input to a processor configured to perform ASR which then interprets the utterance based on the similarity between the utterance and pre-established ASR language models stored in an ASR model knowledge base (ASR Models Storage 1020). For example, the ASR process may compare the input audio data with models for sounds (e.g., subword units or phonemes) and sequences of sounds to identify words that match the sequence of sounds spoken in the utterance of the audio data.

The different ways a voice command 1006 may be interpreted (i.e., the different hypotheses) may each be assigned an ASR probability or an ASR confidence score representing the likelihood that a particular set of words matches those spoken in the utterance. The ASR confidence score may be based on a number of factors including, for example, the similarity of the sound in the utterance to models for language sounds (e.g., an acoustic model 1022 stored in an ASR Models Storage 1020), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 144 outputs the most likely text recognized in the audio data. The ASR component 144 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 1014 and a speech recognition engine 1024. The acoustic front end (AFE) 1014 transforms the audio data from the microphone into data for processing by the speech recognition engine 1024. The speech recognition engine 1024 compares the speech recognition data with acoustic models 1022, language models 1026, and other data models and information for recognizing the speech conveyed in the audio data. The AFE 1014 may reduce noise in the audio data and divide the digitized audio data into frames representing time intervals for which the AFE 1014 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 1014 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1024 may process the output from the AFE 1014 with reference to information stored in speech/model storage. Alternatively, post front-end processed data (such as feature vectors) may be received by the device executing ASR processing from another source besides the internal AFE 1014. For example, the control device 104 may process audio data into feature vectors (for example using an on-device AFE 1014) and transmit that information to a server across a network for ASR processing. Feature vectors may arrive at the remote system 102 encoded, in which case they may be decoded prior to processing by the processor executing the speech recognition engine 1024.

The speech recognition engine 1024 attempts to match received feature vectors to language phonemes and words as known in the stored acoustic models 1022 and language models 1026. The speech recognition engine 1024 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 1024 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1024 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 102, for natural language understanding (NLU) processing, such as conversion of the text into commands for execution, either by the control device 104, by the remote system 102, or by another device (such as the application system 148).

The NLU component 146 (e.g., server) may include various components, including potentially dedicated processor(s), memory, storage, etc. As shown in FIG. 10, the NLU component 146 may include a recognizer 1028 that includes a named entity recognition (NER) component 1030 which is used to identify portions of query text that correspond to a named entity that may be recognizable by the system. A downstream process called named entity resolution links a text portion to a specific entity known to the system. To perform named entity resolution, the system may utilize gazetteer information 1032 stored in entity library storage 1034. The gazetteer information may be used for entity resolution, for example matching ASR results with different entities (such as contact names, etc.) Gazetteers may be linked to users (for example a particular gazetteer may be associated with a specific user's gaming collection), may be linked to certain domains (such as gaming), or may be organized in a variety of other ways.

Generally, the NLU component 146 takes textual input (such as the textual input determined by the ASR component 144) and attempts to make a semantic interpretation of the text. That is, the NLU component 146 determines the meaning behind the text based on the individual words and then implements that meaning. NLU component 146 interprets a text string to derive an intent or a desired action from the user as well as the pertinent pieces of information in the text that allow a device (e.g., control device 104, the application system 148, etc.) to complete that action. For example, if a spoken utterance is processed using ASR component 144 and outputs the text "move the character forward", the NLU component 146 may determine that the user 1008 intended that the character in a gaming application is to move forward. For a second example, if a spoken utterance is processed using ASR component 144 and outputs the text "begin a gaming application", the NLU component 146 may determine that the user 1008 intended that the for the application system 148 to begin the gaming application.

The NLU component 146 may process several textual inputs related to the same utterance. For example, if the ASR component 144 outputs N text segments (as part of an N-best list), the NLU component 146 may process all N outputs to obtain NLU results.

To correctly perform NLU processing of speech input, the NLU component 146 may be configured to determine a "domain" of the utterance so as to determine and narrow down which services offered by the endpoint device (e.g., remote system 102, the control device 104, the application system 148, etc.) may be relevant. For example, an endpoint device may offer services relating to interactions with a telephone service, a contact list service, a calendar/scheduling service, a gaming service, an application service etc. Words in a single text query may implicate more than one service, and some services may be functionally linked (e.g., both a telephone service and a gaming service may utilize data from the contact list).

The named entity recognition (NER) component 1030 receives a query in the form of ASR results and attempts to identify relevant grammars and lexical information that may be used to construe meaning. To do so, the NLU component 146 may begin by identifying potential domains that may relate to the received query. The NLU storage 1036 includes a database of devices domains 1052 which identify domains associated with specific devices. For example, the control device 104 may be associated with domains for gaming, telephony, calendaring, contact lists, and device-specific communications, but not video. In addition, the device domains 1052 may include database entries about specific services on a specific device, either indexed by Device ID, User ID, or Household ID, or some other indicator.

In NLU processing, a domain may represent a discrete set of activities having a common theme, such as "gaming," "telephony," "calendaring," etc. As such, each domain may be associated with a particular recognizer 1028, language model and/or grammar databases 1040, a particular set of domain intents/actions 1038, and a particular personalized domain lexicon 1042. Each gazetteer 1032 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 1044 parses the query to determine an intent or intents for each identified domain, where the intent corresponds to the action to be performed that is responsive to the query. Each domain is associated with a database (e.g., domain intents 1038) of words linked to intents. For example, a gaming domain intent database 1038 may link words and phrases such as "move forward," "move backwards," and "jump" to an "actions" intent. A voice-message domain intent database, meanwhile, may link words and phrases such as "send a message," "send a voice message," "send the following," or the like. The IC component 1044 identifies potential intents for each identified domain by comparing words in the query to the words and phrases in the domain intents database 1038. In some instances, the determination of an intent by the IC component 1044 is performed using a set of rules or templates that are processed against the incoming text to identify a matching intent.

In order to generate a particular interpreted response, the NER 1030 applies the grammar models and lexical information associated with the respective domain to actually recognize a mention of one or more entities in the text of the query. In this manner, the NER component 1030 identifies "slots" (i.e., particular words in query text) that may be needed for later command processing. Depending on the complexity of the NER component 1030, it may also label each slot with a type of varying levels of specificity (such as noun, place, city, artist name, song name, or the like). Each grammar model 1040 includes the names of entities (i.e., nouns) commonly found in speech about the particular domain (i.e., generic terms), whereas the lexical information from the gazetteer 1032 is personalized to the user(s) and/or the device. For instance, a grammar model associated with the gaming domain may include a database of words commonly used when people discuss gaming and/or are playing a gaming application.

The intents identified by the IC component 1044 are linked to domain-specific grammar frameworks (included in 1040) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (1040) framework or frameworks may correspond to sentence structures such as "Send a message to {contact}," "Send a voice message to {contact}," "Send the following to {contact}," etc.

For example, the NER component 1030 may parse the query to identify words as subject, object, verb, preposition, etc., based on grammar rules and/or models, prior to recognizing named entities. The identified verb may be used by the IC component 1044 to identify intent, which is then used by the NER component 1030 to identify frameworks. A framework for the intent of "send a message," meanwhile, may specify a list of slots/fields applicable to play the identified "contact" and any object modifier (e.g., specifying a device of the recipient) or the like. The NER component 1030 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1030 may search the database of generic words associated with the domain (in the knowledge base 1046). So, for instance, if the query was "send message to Joe," after failing to determine a last name for "Joe," the NER component 1030 may search the domain vocabulary for the word "Joe." In the alternative, generic words may be checked before the gazetteer information, or both may be tried, potentially producing two different results.

The output data from the NLU component 146 (which may include tagged text, commands, etc.) may then be sent to the command-processing component 1048. The destination command-processing component 1048 may be determined based on the NLU output. For example, if the NLU output includes a command to send a message, the command-processing component 1048 may be a message sending application, such as one located on the control device 104, the application system 148, or in a message sending appliance, configured to execute a message sending command. If the NLU output includes an input to a gaming application, such as moving a character in a given direction, the destination command processor may include the application system 148 configured to execute the command.

The NLU operations of existing systems may take the form of a multi-domain architecture. Each domain (which may include a set of intents and entity slots that define a larger concept such as gaming, messaging etc. as well as components such as trained models, etc. used to perform various NLU operations such as NER, IC, or the like) may be constructed separately and made available to an NLU component 146 during runtime operations where NLU operations are performed on text (such as text output from an ASR component 1014). Each domain may have specially configured components to perform various steps of the NLU operations.

For example, in an NLU system, the system may include a multi-domain architecture consisting of multiple domains for intents/commands executable by the system (or by other devices connected to the system), such as gaming, messaging, and information. The system may include a plurality of domain recognizers, where each domain may include its own recognizer 1028. Each recognizer may include various NLU components such as an NER component 1030, IC component 1044 and other components such as an entity resolver, or other components.

The command-processing component 1048 and/or NLU component 146 may determine a domain based on the intent and, based on this determination, route the request corresponding to the audio data to the appropriate domain speechlet, such as the illustrated domain speechlets 1050. The domain speechlets 1050 may comprise any type of device or group of devices (e.g., hardware device, virtual devices or partitions, server, etc.), and may receive the text data and/or an intent associated with the audio data 1002 and determines how to respond to the request. For instance, the intent for a command "walk the character forward" may be routed to a gaming domain speechlet 1050 which controls devices such as the application system 148.

Various types of domain speechlets 1050 may be used to determine which devices 1002 to use to respond to a voice command 1006, as well as the appropriate response and potential additional content (e.g., audio data). For example, the domain speechlets 1050 may include a third party skills domain speechlet 1050 which may handle intents associated with gaming, productivity, etc., a music domain speechlet 1050 which may handle intents associated with music play requests (e.g., Amazon Music, Pandora, Spotify, iHeart, etc.), a video domain speechlet 1050 which may handle intents associated with video play requests (e.g., Amazon Video, HBO, Netflix, Hulu, etc.), a household organization domain speechlet 1050 which may handle intents associated with household activities (e.g., calendars, reminders, timers, etc.), a smart home domain speechlet 1050 which may handle intents associated with controlling smart devices (e.g., controlling lights, door locks, home monitoring, etc.), an automotive domain speechlet 1050, a shopping domain speechlet 1050 which may handle shopping requests (e.g., making a shopping list, ordering items online, etc.), and/or a weather domain speechlet 1050 which may handle requests for weather forecasts (e.g., providing a URL to a weather website, providing weather related images and/or videos, etc.).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system that is located remotely from an environment that includes a handheld controller and a display device, the system comprising:
at least one database storing:
profile data indicating a first identifier associated with the handheld controller and a second identifier associated with the display device; and
game data representing a game;
one or more processors; and
one or more computer-readable media storing instructions that, when executed by one or more processors, cause the one or more processors to perform operations comprising:
receiving, from the handheld controller and over the network, first data representing the first identifier;
determining, using the profile data, that the first data is received from the handheld controller;
determining, using the profile data, that the handheld controller is associated with the display device;
sending, over the network, first video data to the display device, the first video data representing a first state of the game;
receiving, from the handheld controller and over the network, input data representing an input received by the handheld controller;
based at least in part on the input data, updating the first state of the game to a second state of the game;
sending, over the network and to the display device, second video data representing the second state of the game;
sending, over the network, first timestamp data to the display device, the first timestamp data including a first instruction to display the second state of the game at a first time;
sending, over the network and to the handheld controller, audio data representing sound corresponding to the second state of the game; and
sending, over the network, second timestamp data to the handheld controller, the second timestamp data including a second instruction to output the sound at a second time, the second time being within a threshold period of time to the first time.

2. The system as recited in claim 1, the one or more computer-readable media storing further instructions that, when executed by the one or more processors, cause the one or more processors to perform further operations comprising:
sending, over the network and to the display device, additional audio data representing the sound corresponding to the second state of the game; and
sending, over the network, third timestamp data to the display device, the third timestamp data including a third instruction to output the sound at a third time, the third time being within a threshold period of time to the first time.

3. The system as recited in claim 1, wherein the first state of the game includes an object located at a first position within a gaming environment, and wherein updating the first state of the game to the second state of the game comprises:
determining, using the input data, a second position of the object within the game environment; and updating a position of the object within the gaming environment from the first position within the gaming environment to the second position within the gaming environment.

4. A method comprising:
determining, by a remote system, that an electronic device is associated with a display device;
sending, by the remote system and to the display device, video data representing a first state of a game;
sending, by the remote system and to the electronic device, audio data representing sound associated with the first state of the game;
sending, by the remote system and to the display device, first data representing a first timestamp, the first timestamp including a first instruction to display the first state of the game at a first time;
sending by the remote system and to the electronic device, second data representing a second timestamp, the second timestamp including a second instruction to output the sound at a second time, the second time being within a threshold period of time to the first time;
receiving, by the remote system and from the electronic device, input data representing an input received by the electronic device; and
determining, by the remote system, a second state of the game based at least in part the first state of the game and the input data.

5. The method as recited in claim 4, further comprising:
establishing, by the remote system, a first network connection with the electronic device, wherein receiving the input data is over the first network connection; and
establishing, by the remote system, a second network connection with the display device, wherein sending the video data is over the second network connection.

6. The method as recited in claim 4, wherein determining the second state of the game based at least in part the first state of the game and the input data comprises:
determining, by the remote system, that the first state of the game includes an object located at a first position within a game environment;
determining, by the remote system, a second position for the object based at least in part on the first position and the input data; and
determining, by the remote system, that the second state of the game includes the object located at the second position within the environment.

7. The method as recited in claim 4, further comprising:
sending, by the remote system and to the display device, additional video data representing one or more games, the one or more games including the game;
receiving, by the remote system and from the electronic device, additional input data representing an additional input received by the electronic device; and
initiating, by the remote system, the game based at least in part on the additional input data.

8. The method as recited in claim 4, wherein the input data includes audio data representing user speech, and wherein the method further comprises:
determining, by the remote system, one or more words represented by the user speech,
wherein determining the second state of the game based at least in part the first state of the game and the input data comprises determining, by the remote system, the second state of the game based at least in part the first state of the game and the one or more words.

9. The method as recited in claim 4, further comprising:
storing, by the remote system and in a database, third data representing a first identifier associated with the electronic device and a second identifier associated with the display device;
receiving, by the remote system and from the electronic device, fourth data representing the first identifier; and
determining, by the remote system and using the third data, that the fourth data is sent from the electronic device,
wherein determining that the display device is associated with the electronic device is based at least in part on the third data.

10. The method as recited in claim 4, further comprising:
receiving, by the remote system, third data representing a first identifier associated with the electronic device;
receiving, by the remote system, fourth data representing a second identifier associated with the display device; and
generating, by the remote system, fifth data representing a user profile, the fifth data indicating at least the first identifier associated with the electronic device and the second identifier associated with the display device.

11. The method as recited in claim 4, further comprising:
determining, by the remote system, that the electronic device is associated with an additional display device; and
sending, by the remote system and to the additional display device, the video data representing the first state of the game.

12. The method as recited in claim 11, further comprising sending, by the remote system and to the additional display device, third data representing a third timestamp, the third timestamp associated with synchronizing a displaying of the first state of the game by the additional display device with displaying of the first state of the game by the display device.

13. The method as recited in claim 4, further comprising:
receiving, by the remote system and from an additional electronic device, additional input data representing an additional input received by the additional electronic device;
determining, by the remote system, a third state of the game based at least in part the second state of the game and the additional input data; and
sending, by the remote system and to the display device, additional video data representing the third state of the game.

14. The method of claim 4, further comprising:
receiving, by the remote system and from the display device, third data representing a first identifier associated with the display device;
determining, by the remote system and using profile data, that the third data is received from the display device, the profile data indicating the first identifier associated with the display device and a second identifier associated with the electronic device; and
wherein determining that the electronic device is associated with the display device is based at least in part on the profile data.

15. A system comprising:
one or more processors; and
one or more computer-readable media storing instructions that, when executed by the one or more processors, cause the one or more processors to perform operations comprising:

storing data associated with a game;

receiving, from an electronic device and over a network, first input data representing a selection of the game;

sending, to a display device and over the network, video data representing a first state of the game;

sending, to the display device, first data representing a first instruction to display the first state of the game at a first time;

sending, to the electronic device, audio data representing sound associated with the first state of the game;

sending, to the electronic device, second data representing a second instruction to output the sound at a second time;

receiving, from the electronic device and over the network, second input data representing an input received by the electronic device; and determining a second state of the game based at least in part on the first state of the game and the second input data.

16. The system as recited in claim 15, the one or more computer-readable media storing further instructions that, when executed by the one or more processors, cause the one or more processors to perform further operations comprising:

establishing a first network connection with the electronic device, wherein receiving the second input data is over the first network connection; and establishing a second network connection with the display device, wherein sending the video data is over the second network connection.

17. The system as recited in claim 15, wherein determining the second state of the game based at least in part the first state of the game and the second input data comprises:

determining that the first state of the game includes an object located at a first position within a game environment;

determining a second position for the object based at least in part on the first position and the second input data; and determining that the second state of the game includes the object located at the second position within the environment.

18. The system as recited in claim 15, the one or more computer-readable media storing further instructions that, when executed by the one or more processors, cause the one or more processors to perform further operations comprising sending, to the display device, additional video data representing one or more games, the one or more games including the game.

19. The system as recited in claim 15, the one or more computer-readable media storing further instructions that, when executed by the one or more processors, cause the one or more processors to perform further operations comprising:

storing third data representing an association between the electronic device and the display device;

receiving, from the electronic device, fourth data representing an identifier associated with the electronic device; and determining, using the third data, that the electronic device is associated with the display device;

wherein sending the video data is based at least in part on determining that the electronic device is associated with the display device.

20. The system of claim 15, the operations further comprising:

receiving, from the display device and over the network, third data representing a first identifier associated with the display device;

determining, using profile data, that the third data is received from the display device, the profile data indicating the first identifier associated with the display device and a second identifier associated with the electronic device; and determining, using the profile data, that the display device is associated with the electronic device.

* * * * *